(12) United States Patent
Watanabe et al.

(10) Patent No.: US 8,870,710 B2
(45) Date of Patent: Oct. 28, 2014

(54) VEHICLE DRIVE CONTROL SYSTEM

(75) Inventors: Shinji Watanabe, Chiyoda-ku (JP); Nozomu Kamioka, Chiyoda-ku (JP); Kensuke Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 440 days.

(21) Appl. No.: 13/232,537

(22) Filed: Sep. 14, 2011

(65) Prior Publication Data
US 2012/0295757 A1    Nov. 22, 2012

(30) Foreign Application Priority Data

May 19, 2011    (JP) ................ 2011-112267

(51) Int. Cl.
| | |
|---|---|
| *B60W 10/08* | (2006.01) |
| *B60W 30/18* | (2012.01) |
| *B60W 10/30* | (2006.01) |
| *B60W 10/06* | (2006.01) |
| *F02N 11/08* | (2006.01) |
| *F02N 11/04* | (2006.01) |

(52) U.S. Cl.
CPC ......... *B60W 10/06* (2013.01); *B60W 30/18063* (2013.01); *F02N 2011/0896* (2013.01); *F02N 2300/2004* (2013.01); *F02N 2200/022* (2013.01); *B60W 2510/0676* (2013.01); *F02N 11/0814* (2013.01); *B60W 2540/10* (2013.01); *B60W 2510/0604* (2013.01); *B60W 2510/0685* (2013.01); *F02N 11/0822* (2013.01); *B60W 10/30* (2013.01); *F02N 2300/104* (2013.01); *B60W 2540/12* (2013.01); *B60W 2710/0644* (2013.01); *B60W 2510/105* (2013.01); *Y02T 10/48* (2013.01); *B60W 2510/0638* (2013.01); *F02N 11/04* (2013.01); *B60W 30/18018* (2013.01)
USPC ............................................................ 477/4

(58) Field of Classification Search
CPC .......... B60W 10/08; B60W 30/18063; B60W 2510/0604; B60W 2510/0638; B60W 2510/0676; B60W 2510/0685; B60W 2710/0644
See application file for complete search history.

(56) References Cited

U.S. PATENT DOCUMENTS

| | | | |
|---|---|---|---|
| 5,722,502 A | * | 3/1998 | Kubo ........................ 180/65.23 |
| 6,742,487 B2 | | 6/2004 | Yamaguchi et al. |
| 2001/0022166 A1 | | 9/2001 | Yamaguchi et al. |

FOREIGN PATENT DOCUMENTS

| | | |
|---|---|---|
| JP | 11-122712 A | 4/1999 |
| JP | 11-153075 A | 6/1999 |
| JP | 2002-213279 A | 7/2002 |
| JP | 4075311 B2 | 7/2002 |

OTHER PUBLICATIONS

Japanese Office Action dated Sep. 11, 2012 issued in corresponding Japanese Patent Application No. 2011-112267.

\* cited by examiner

*Primary Examiner* — Robert A Siconolfi
*Assistant Examiner* — Huan Le
(74) *Attorney, Agent, or Firm* — Sughrue Mion, PLLC; Richard C. Turner

(57) ABSTRACT

A vehicle drive control system includes a motor coupled with the driving shaft of an internal combustion engine so that torque can be transmitted to the drive wheels when fuel supply to the engine is cut off. The vehicle travels in a creeping mode in this state while motoring of the engine is performed through driving force of the motor. When accelerator depression is detected, fuel injection into a cylinder waiting for the intake stroke of the engine is begun and the engine is started. The crank angle position at a time when fuel injection is started is utilized as a reference position. When the crankshaft of the engine rotates from the reference crank angle position to a predetermined crank angle position, driving by the motor is stopped and the vehicle is then driven by the engine.

8 Claims, 17 Drawing Sheets

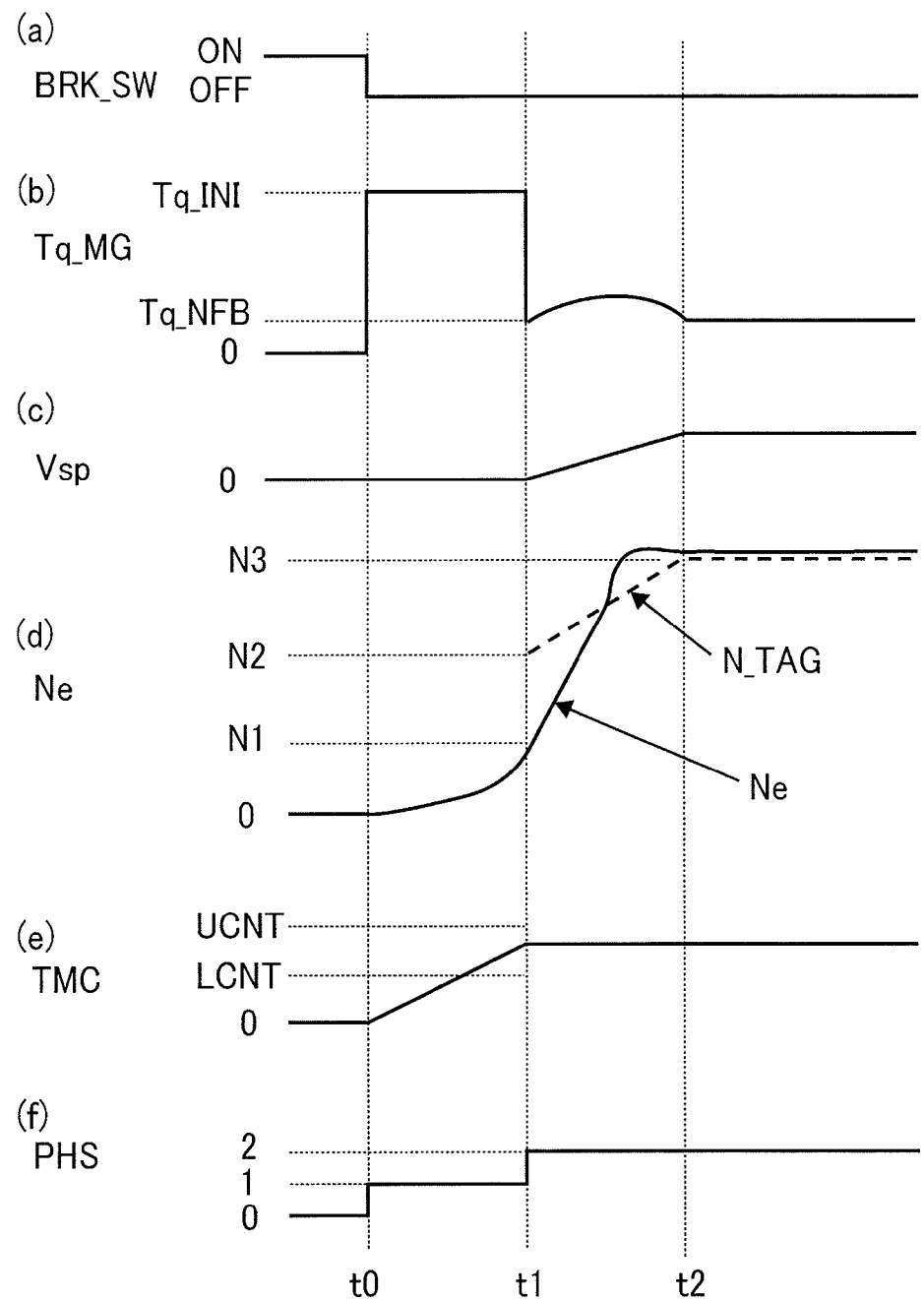

VEHICLE DRIVE CONTROL SYSTEM

BACKGROUND OF THE INVENTION

1. Field of the Invention

The present invention relates to a vehicle drive control system that controls a driving device for driving a vehicle such as an automobile.

As is well known, there has been disclosed a vehicle drive control system in which under the condition that there is provided a motor coupled with the driving shaft of an internal combustion engine (referred to as an engine, hereinafter) mounted in a vehicle and hence the torque of the engine can be transmitted to the drive wheels, when the brake pedal is released while the acceleration pedal is released, the engine is driven by the motor (motoring) so that the vehicle travels in a creeping manner; when an engine starting condition is satisfied, for example, due to depression of the acceleration pedal, fuel injection is resumed so that the engine is restarted; then, driving force produced by the motor for the vehicle is changed to driving force produced by the engine so that the vehicle travels.

2. Description of the Related Art

To date, with regard to a vehicle drive control system of this type, there has been proposed a control system, for performing vehicle engine automatic stop/restart, in which, for example, when the vehicle speed becomes "zero" while the brake pedal is depressed, the engine automatically stops, and in this situation, when the acceleration pedal is depressed or when the brake pedal is released, the engine is automatically restarted.

In an engine starting control apparatus disclosed in Patent Document 1, when the brake pedal is released under the condition that the brake pedal has been being depressed and the vehicle and the engine are at a standstill, the electromagnetic clutch provided between the crankshaft of the engine and the crank pulley is turned on and drive control is applied to the electric motor generator (referred to as a motor generator, hereinafter) with a target rotation speed of the idle rotation speed of the engine so that the rotation speed of the engine is raised; in the case where after the brake pedal is released under this condition, the accelerator pedal is not depressed, fuel cutoff is cancelled and fuel supply is resumed at a time point when the engine rotation speed becomes as high as the idle rotation speed so that the engine is restarted. In the foregoing conventional apparatus, until the engine is restarted, the driving force of the motor generator makes the vehicle travel in a creeping manner.

In the engine starting control apparatus disclosed in Patent Document 1, because after the driving force of the motor generator raises the engine rotation speed to the idle rotation speed, fuel supply is resumed so as to start the engine, the engine, which is in a creeping travel mode, is restarted; therefore, the engine is smoothly restarted, whereby the shock caused by restarting the engine can be suppressed.

PRIOR ART REFERENCE

Patent Document

[Patent Document 1] Japanese Patent No. 4075311

In the case where by utilizing the engine starting control apparatus disclosed in Patent Document 1, a vehicle is made to start moving while engine motoring is performed through the driving force of the motor generator and the vehicle travels in a creeping manner, under the condition that when idling stop is being performed, the brake pedal is released and the accelerator pedal is not depressed, drive control is applied to the motor generator with a target rotation speed of the engine idle rotation speed; when engine cranking is started, the rotation load torque, produced by a compression resistance at a time when the piston comes to the compression stroke, friction torque, and the like, has a peak value; after that, the rotation load torque gradually decreases, whereby the engine is at a standstill until the rotation load torque passes through the peak value; when drive control through an ordinary feedback control is applied to the motor generator with a target rotation speed of the idle rotation speed, the integration value of rotation-speed deviations (=target idle rotation speed−engine rotation speed) becomes abnormally large before the engine starts to rotate, whereby when the engine starts to rotate, the driving force of the motor generator is excessively outputted; thus, there has been a problem that when the vehicle starts moving, large torque shock is produced.

SUMMARY OF THE INVENTION

The present invention has been implemented in order to solve the foregoing problems in conventional vehicle drive control systems; the objective thereof is to provide a vehicle drive control system that can suppress torque shock produced when a vehicle starts moving, in the case where the vehicle is made to travel in a creeping manner while engine motoring is performed through the driving force of the motor generator, under the condition that when idling stop is being performed, the brake pedal is released and the accelerator pedal is not depressed.

A vehicle drive control system according to the present invention is configured in such a way that under the condition that there is provided a motor coupled with the driving shaft of an internal combustion engine mounted in a vehicle and hence the torque of the engine can be transmitted to the drive wheels of the vehicle when fuel supply to the engine is cut off, the vehicle is made to travel in a creeping manner while motoring of the engine is performed through driving force of the motor; the vehicle drive control system is characterized in that in the case where when braking operation is cancelled while accelerating operation is stopped, the vehicle is made to travel in a creeping manner while motoring of the engine is performed through the driving force of the motor, when the rotation speed of the engine is the same as or lower than a first predetermined rotation speed, the motor is controlled in such a way that a preliminarily set initial value of the driving torque is outputted until the engine rotation speed reaches the first predetermined rotation speed.

In an electronic control apparatus according to the present invention, in the case where when braking operation is cancelled while accelerating operation is stopped, the vehicle is made to travel in a creeping manner while motoring of the engine is performed through the driving force of the motor, when the rotation speed of the engine is the same as or lower than a first predetermined rotation speed, the motor is controlled in such a way that a preliminarily set initial value of the driving torque is outputted until the engine rotation speed reaches the first predetermined rotation speed; therefore, the torque shock can be suppressed when the vehicle starts moving.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 10 is a timing chart for explaining the operation of a vehicle drive control system according to Embodiment 1 of the present invention;

DETAILED DESCRIPTION OF THE PREFERRED EMBODIMENTS

Embodiment 1

Figure 1:
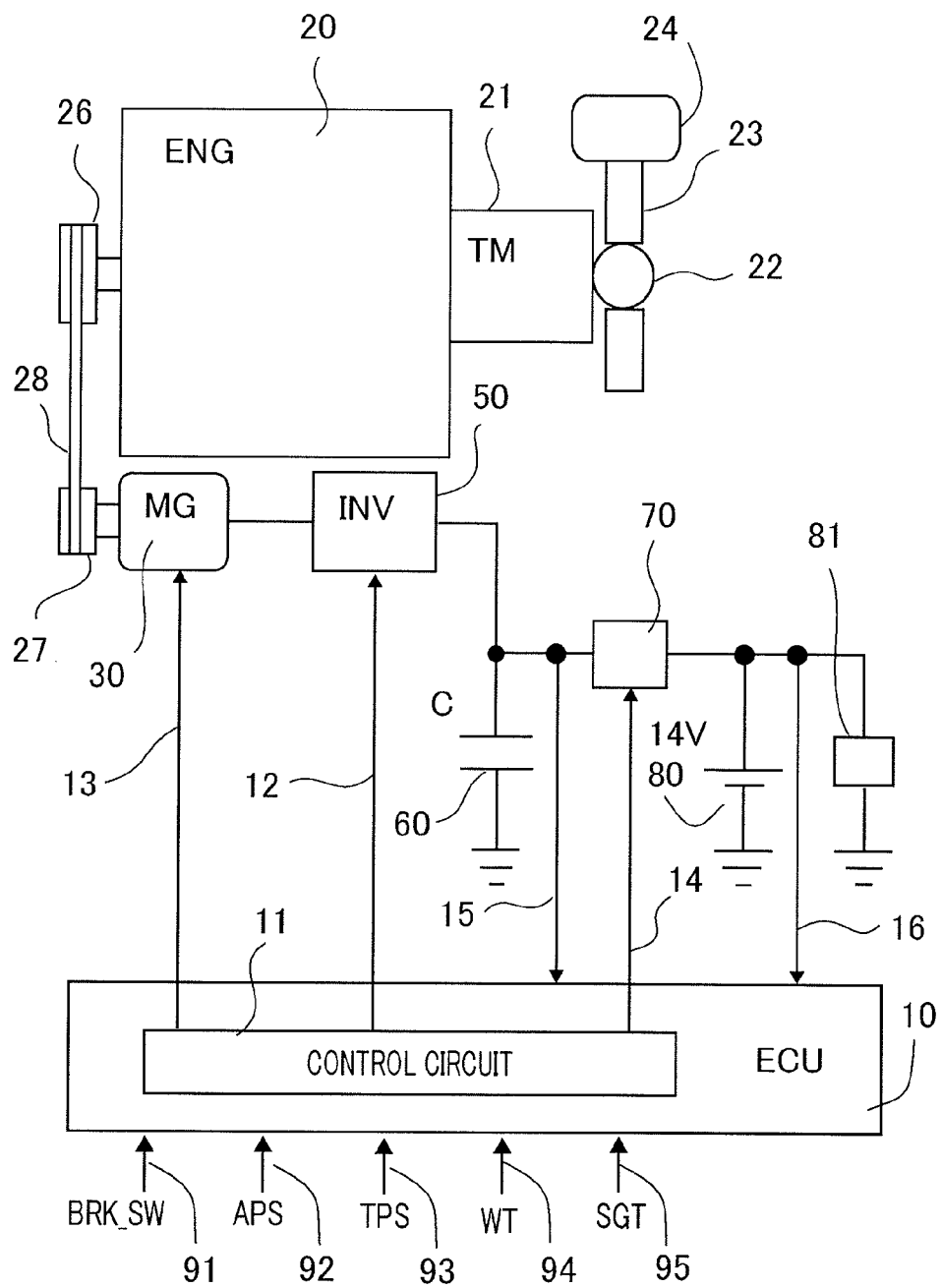
FIG. 1 is a configuration diagram schematically illustrating a configuration of a vehicle drive control system according to Embodiment 1 of the present invention.

Hereinafter, there will be explained a vehicle drive control system according to Embodiment 1 of the present invention. FIG. 1 is a configuration diagram schematically illustrating a configuration of a vehicle drive control system according to Embodiment 1 of the present invention. In FIG. 1, a motor generator 30 mounted in a vehicle is a belt-driven motor generator and is provided with a motor generator pulley 27 provided on the rotor shaft thereof. The motor generator 30 corresponds to a motor generator in the present invention.

An engine (ENG) 20 mounted in a vehicle is provided with a crankshaft pulley 26 provided on the crankshaft thereof. The motor generator pulley 27 and the crankshaft pulley 26 are coupled with each other by the intermediary of a belt 28; when the motor generator 30 operates as a motor, the driving force of the motor generator 30 is transmitted to the engine 20 by the intermediary of the belt 28; when the motor generator 30 operates in a power-generation mode, the driving force of the engine 20 is transmitted to the motor generator 30 by the intermediary of the belt 28.

In the case where the vehicle is decelerated through braking operation while accelerating operation is cancelled by a driver, the engine 20 is controlled to be in a fuel cutoff mode, and hence the vehicle speed is reduced; thus, an idling stop condition is satisfied and the vehicle comes to a standstill. Next, when the driver cancels the braking operation so as to make the vehicle start moving, the engine 20, which is kept in the fuel cutoff mode, is driven by the motor generator 30 (motoring), so that the vehicle travels in a creeping manner. In this case, the driving force of the motor generator 30 is transmitted to the crankshaft of the engine 20 by the intermediary of the belt 28, inputted to a transmission (TM) 21 while motoring is applied to the engine 20, and is transmitted to a wheel 24 by the intermediary of a drive shaft 23; then, the vehicle travels in a creeping manner.

When the vehicle is accelerated through accelerating operation by the driver, the driving force of the engine 20 is inputted to the transmission (TM) 21 and then is transmitted to the wheel 24 by the intermediary of a differential gear 22 and the drive shaft 23. When the vehicle is decelerated, braking force produced by braking operation of the driver is transmitted from the wheel 24 to the engine 20 through a transmission path, which is opposed to the transmission path at a time when the vehicle is accelerated; then, the braking force is converted into thermal energy and is emitted.

An engine control unit (ECU) 10 includes a microcomputer and a memory; in addition to basic control, of the air-intake amount, the fuel injection amount, the ignition timing, and the like, that is required for driving the engine 20, the engine control unit 10 performs control of auxiliary apparatuses, such as motor/generator control of the motor generator 30, deceleration fuel cutoff control, idle stop/start control, and the like.

These control items performed by the engine control unit 10 are implemented based on calculation processing that is performed by the microcomputer based on the traveling status of the vehicle, a brake switch signal (BRK_SW) 91 for detecting the operation of the brake pedal, an accelerator opening degree signal (APS) 92 for detecting the operation amount of accelerator pedal, a throttle opening degree signal (TPS) 93 for detecting the amount of throttle valve opening degree, a water temperature signal (WT) 94 for detecting the temperature of engine coolant water, a crank angle signal (SGT) 95 that is outputted from a crank angle sensor (unillustrated) in response to the rotation of the crankshaft, a shift position signal at the transmission 21, a vehicle speed signal, and map data and a program stored in the memory. The crank angle signal (SGT) 95 is generated, for example, every crank angle of 10°, and utilized as a signal for detecting the crank angle and the engine rotation speed.

A capacitor 60 stores electric power generated by the motor generator 30. An inverter unit (INV) 50 performs electric-power communication between the motor generator 30 and the capacitor 60. A secondary battery (referred to as a battery, hereinafter) supplies electric power to an electric load 81 such as an auxiliary apparatus or the like. When the voltage across the capacitor 60 is higher than the voltage of the secondary battery 80, a step-down converter 70 steps down the voltage across the capacitor 60 to the rated voltage of the battery 80.

Based on a capacitor voltage Vcap and a battery voltage VB obtained by A/D-converting a voltage signal 15 from the capacitor 60 and a voltage signal 16 from the battery 80 by use of an A/D converter (unillustrated), a control circuit 11 included in the engine control unit 10 calculates, through calculation processing, a drive signal 12 for an inverter module 51, described later, in the inverter unit 50, a driving signal (magnetic-field current) 13 for the magnetic-field winding of the motor generator 30, and a driving signal (DUTY) 14 for the step-down converter 70, and outputs these signals so as to control the motor generator 30.

Figure 2:
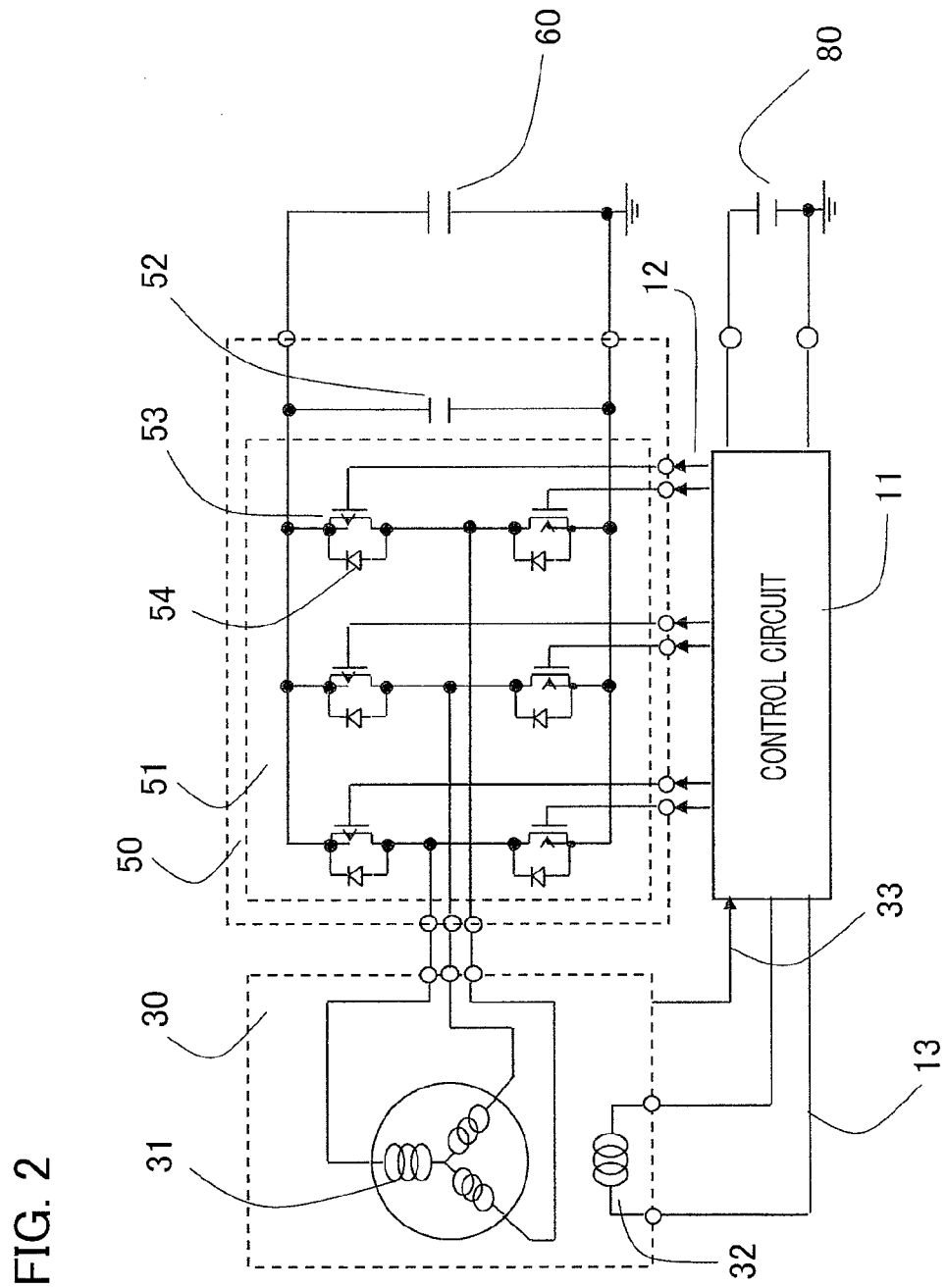
FIG. 2 is a configuration diagram illustrating a control circuit for the motor generator in a vehicle drive control system according to Embodiment 1 of the present invention.

FIG. 2 is a configuration diagram illustrating a control unit for the motor generator in a vehicle drive control system according to Embodiment 1 of the present invention. In FIG. 2, the motor generator 30 is provided with an armature winding 31 provided in the stator thereof and a magnetic-field winding 32 provided in the rotor thereof. In Embodiment 1, the armature winding 31 is formed as three-phase armature windings consisting of three coils that are connected in a Y-shape. The inverter unit 50 includes the inverter module 51 and a current-smoothing capacitor 52 that is connected in parallel with the inverter module 51; the AC terminals thereof are connected with the corresponding terminals of the armature winding 31, and the DC terminals thereof are connected across the capacitor 60.

The inverter module 51 includes an inverter circuit in which two pairs of switching device 53 and diode 54 that are connected in parallel with each other are connected in series (series-connected unit) and three series-connected units are further connected in parallel with one another. A pair of switching device 53 and diode 54 is formed as a single switching element in which the pair is integrally packaged. Each series-connected point of two switching elements in the inverter circuit is connected with the corresponding Y-connection terminal of the armature winding 31 of the motor generator 30 by way of the corresponding AC terminal of the inverter circuit. The DC terminals of the inverter circuit are connected across the capacitor 60.

The magnetic-field winding 32 of the motor generator 30 forms a magnetic-field circuit that controls the magnetic-field current of the motor generator 30, and is connected with the control circuit 11. The control circuit 11 receives a rotation signal 33 corresponding to the rotation position of the rotor of the motor generator 30, gives a gate signal 12 to the switching device 53 of the inverter module 51, based on the rotation signal 33, so as to control the switching operation thereof, and controls the magnetic-field current of the magnetic-field circuit 13.

The motor generator 30 is supplied with AC electric power from the capacitor 60 by way of the inverter unit 50 and operates as a motor to assist the driving force of the engine 20. After the engine 20 is started, the motor generator 30 is driven to rotate by the engine 20 by the intermediary of the belt 28 and operates as an AC power generator; three-phase AC voltages generated in the armature winding 31 are converted into a DC voltage by the inverter unit 50, and then the DC voltage is stored across the capacitor 60.

As described above, the control circuit 11 performs ON/OFF-control of the switching devices 53 of the inverter unit 50, based on the rotation signal 33 from the rotor of the motor generator 30, so that the DC electric power, across the capacitor 60, that is supplied to the DC terminals of the inverter unit 50 is converted into three-phase AC electric power by the inverter unit 50 and is outputted from the AC terminals from the inverter unit 50.

The three-phase AC electric power outputted from the AC terminals from the inverter unit 50 is supplied to the armature winding 31 of the motor generator 30; the control circuit 11 outputs a magnetic-field current corresponding to the driving torque Tq_MG of the motor generator 30 and is supplied to the magnetic-field winding 32 of the rotor of the motor generator 30. As a result, the rotor of the motor generator 30 is driven to rotate by the rotating magnetic field generated by the stator; the torque of the rotor is transmitted to the crankshaft pulley 26 of the engine 20 in the intermediary of the motor generator pulley 27 and the belt 28, so that the engine 20 is driven to rotate.

Due to the torque transmitted from the motor generator 30, the engine 20 undergoes motoring to start or rotation-driving force for the vehicle is assisted. Then, after the engine 20 is started, the torque of the engine 20 is transmitted from the crankshaft pulley 26 to the rotor of the motor generator 30 by the intermediary of the belt 28 and the motor generator pulley 27. Because its rotor is driven to rotate by the torque of the engine 20, the motor generator 30 induces three-phase AC electric power across the armature winding 31.

In Embodiment 1, the control circuit 11 makes the motor generator 30 generate electric power through a mode (referred to as an alternator mode, hereinafter) in which the switching devices 53 are turned off and the generated voltage is rectified and outputted without being stepped up. As a result, the inverter module 51 becomes a three-phase full-wave rectifier circuit in which three pairs of two diodes 54 that are connected in series are connected in parallel with one another, rectifies the three-phase AC electric power induced across the armature winding 31 into DC electric power, and makes the capacitor 60 store the rectified DC electric power.

Figure 3:
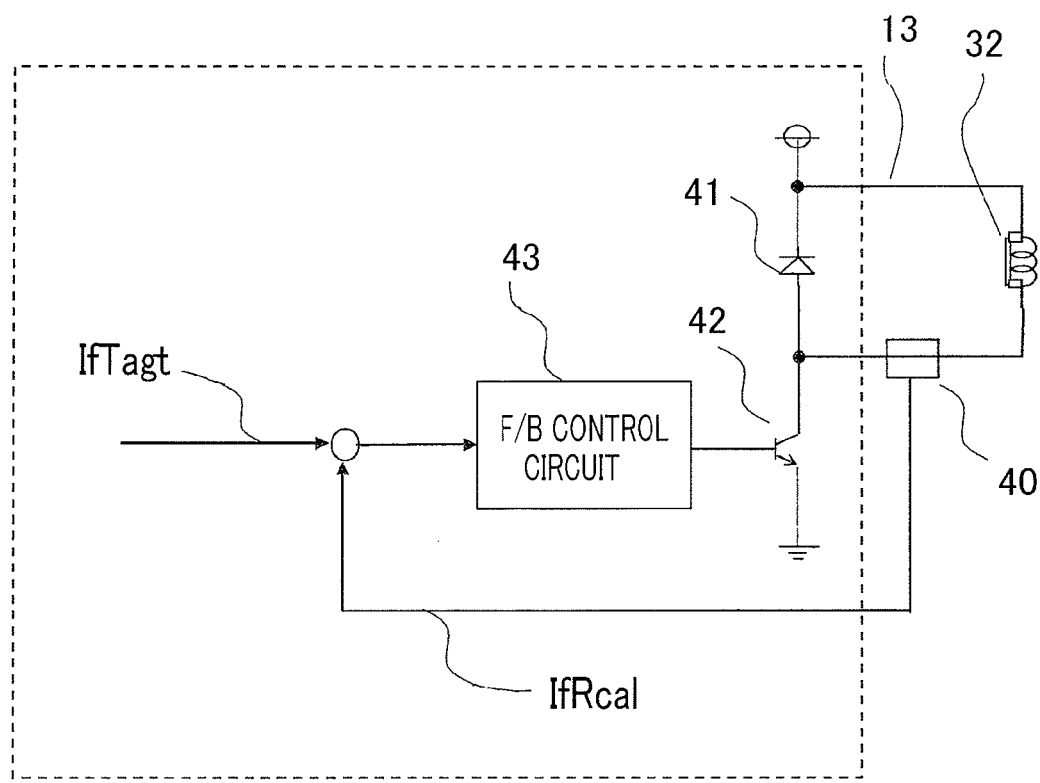
FIG. 3 is a block diagram illustrating a magnetic-field current control unit for the motor generator in a vehicle drive control system according to Embodiment 1 of the present invention.

FIG. 3 is a block diagram illustrating a magnetic-field current control unit for the motor generator in a vehicle drive control system according to Embodiment 1 of the present invention; the elements inside the frame indicated by a broken line are included in the control circuit 11. In FIG. 3, the magnetic-field circuit 13 includes the magnetic-field winding 32, a transistor 42 that is ON/Off-driven, and a flywheel diode 41, and adjusts the magnetic-field current in the magnetic-field winding 32 to a desired value.

A real magnetic-field current detected by a magnetic-field current sensor 40 is inputted to an A/D converter (unillustrated) by way of a filter circuit (unillustrated), A/D-converted in a predetermined cycle (e.g., 5 [ms]), and is read as a real magnetic-field current value IfReal. A current difference amount between the real magnetic-field current value IfReal and a magnetic-field current command value IfTagt set in a power generation mode in which the motor generator 30 operates as an electric power generator or in a motor mode in which the motor generator 30 operates as a motor is inputted to a feedback control circuit (referred to as a F/B control circuit, hereinafter) 43. Based on the inputted current difference amount, the F/B control circuit 43 outputs every predetermined cycle (e.g., 5 [ms]) a drive duty value FCDUTY for the transistor 42 by performing a well-known PI (proportionality-integration) control calculation, and ON/OFF-controls the transistor 42 so as to control the magnetic-field current.

Figure 4:
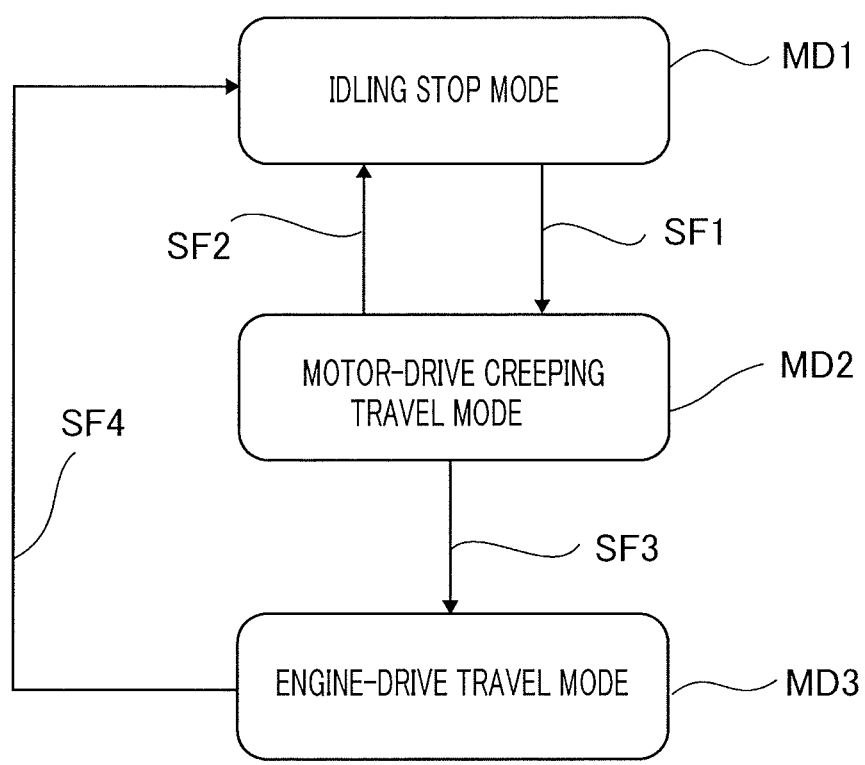
FIG. 4 is an explanatory chart representing a flow of the control mode in a vehicle drive control system according to Embodiment 1 of the present invention.

FIG. 4 is an explanatory chart representing a flow of the control mode in a vehicle drive control system according to Embodiment 1 of the present invention. In FIG. 4, in the case where while the accelerator is being released (accelerator pedal operation is being cancelled) by the driver, brake depression operation SF2 is performed (the brake pedal is depressed), the vehicle comes to a standstill, and the engine 20 comes to an idling stop mode MD1 where the engine is stopped. In the case where when the engine is in the idling stop mode MD1, brake release operation SF1 is performed (the brake pedal is released), the engine 20 is driven by the motor generator 30 to move to a creeping travel mode MD2.

In the creeping travel mode MD2 where the engine 20 is driven by the motor generator 30, the initial value Trq_INI (e.g., 30 [N.m]) is outputted, as the driving torque Tq_MG of the motor generator, to the motor generator 30; when the engine rotation speed increases and reaches a first predetermined rotation speed N1 (e.g., 300 [rpm]), the initial value of a target rotation speed N_TAG is set to a preliminarily set second predetermined rotation speed N2 (e.g., 500[rpm]); as the driving torque Tq_MG of the motor generator 30, there is outputted driving torque Trq_NFB calculated through rotation speed feedback (F/B) control calculation based on the difference (=N_TAG−Ne) between the target rotation speed N_TAG and the engine rotation speed Ne. After that, the target rotation speed N_TAG is set through the target rotation speed calculation (N_TAG=N_TAG+DN1) so that the idle target rotation speed N3 (e.g., 750 [rpm]) is reached at a predetermined first changing speed DN1 (e.g., DN=10 rpm/10 ms); as the driving torque Tq_MG of the motor generator 30, there is outputted driving torque Trq_NFB calculated through the rotation speed F/B control calculation based on the difference between the set target rotation speed N_TAG and the engine rotation speed Ne.

In Embodiment 1 of the present invention, while the vehicle is in the creeping travel mode MD2, the throttle opening degree is set to a target throttle opening degree value at a time of engine idle driving; however, even in the case where in order to reduce load torque corresponding to an air-intake resistance caused by the throttle valve at a time when a creeping travel is performed through the driving torque of the motor generator 30, the target opening degree value is set to the fully-opened position of the throttle, at which the air-intake resistance is minimal, the same effect can be obtained.

In the case where while the vehicle is in the creeping travel mode MD2 where the engine is driven by the motor generator, the driver performs the brake depression operation SF2 in order to stop the vehicle, the engine moves to the idling stop mode MD1.

In the case where while the vehicle is in the creeping travel mode MD2 where the engine is driven by the motor generator, the driver performs accelerator depression operation SF3 in order to accelerate the vehicle, the throttle valve (unillustrated) is opened by driving the throttle actuator (unillustrated) up to the target opening degree value of the throttle, preliminarily set based on the accelerator opening degree signal that is detected in response to the accelerator depression operation SF3; fuel supply to the engine 20 is resumed so as to restart the engine; then, the engine moves to a traveling mode MD3 where the vehicle is driven by the engine.

In the case where while the vehicle is in the traveling mode MD3 where the vehicle is driven by the engine, the driver cancels the accelerating operation in order to decelerate and stop the vehicle and the vehicle speed is reduced due to the braking operation SF4 by the driver, fuel supply to the engine is cut off; when the vehicle speed becomes the same as or lower than a predetermined vehicle speed (e.g., 10 [Km/h]), the idling stop condition is satisfied; then, the engine moves to the idling stop mode MD1.

Figure 5A:
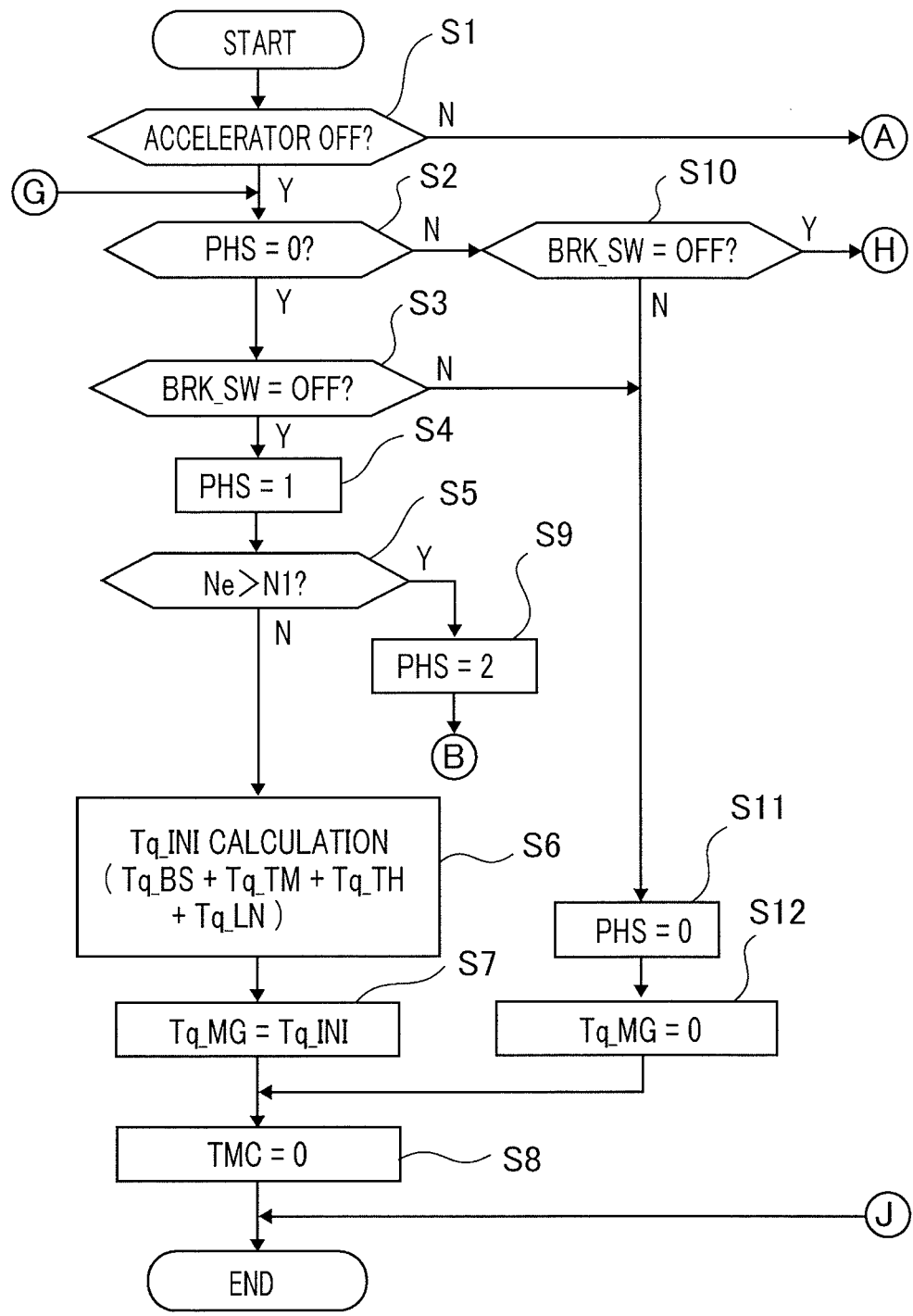
FIG. 5A is a flowchart representing the operation of a vehicle drive control system according to Embodiment 1 of the present invention.
Figure 5B:
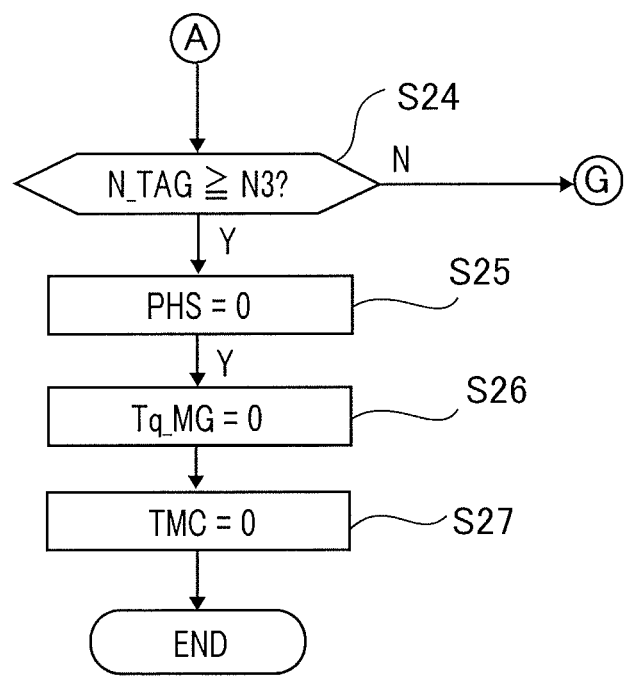
FIG. 5B is a flowchart representing the operation of a vehicle drive control system according to Embodiment 1 of the present invention.
Figure 5C:
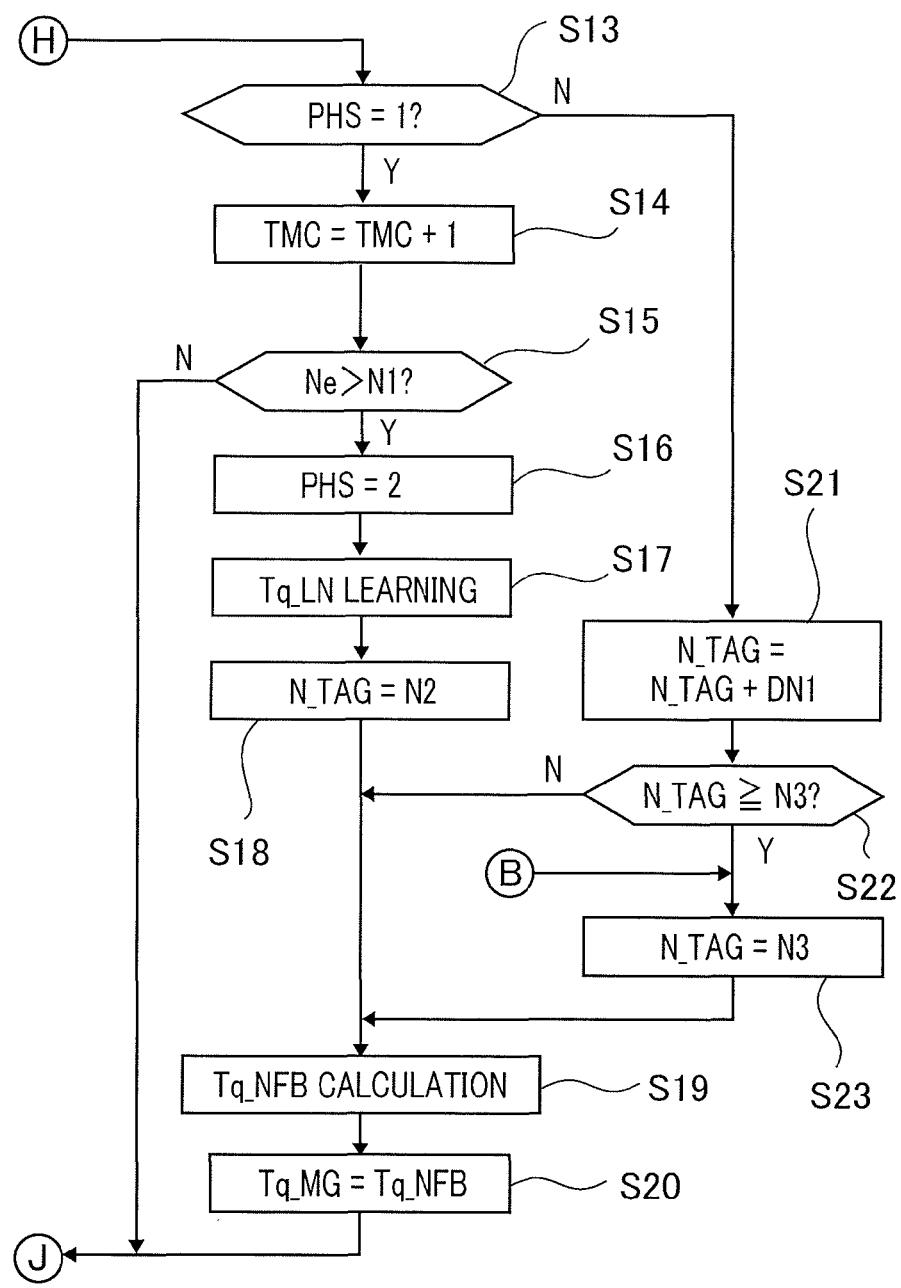
FIG. 5C is a flowchart representing the operation of a vehicle drive control system according to Embodiment 1 of the present invention.

Next, there will be explained more in detail operation of transition from the idling stop mode MD1 to the creeping travel mode MD2 where the engine is driven by the motor generator, in the status flow of the foregoing control mode, schematically explained with reference to FIG. 4. FIG. 5A is a flowchart representing the operation of a vehicle drive control system according to Embodiment 1 of the present invention; FIG. 5B is a flowchart representing the operation of a vehicle drive control system according to Embodiment 1 of the present invention; FIG. 5C is a flowchart representing the operation of a vehicle drive control system according to Embodiment 1 of the present invention; FIGS. 5A, 5B, and 5C represent the operation of transition from the idling stop mode MD1 to the creeping travel mode MD2 where the engine is driven by the motor generator.

In FIGS. 5A, 5B, and 5C, at first, in the step S1, it is determined whether or not the accelerator is OFF (the accelerator pedal is released) while the vehicle is in the idling stop mode MD1. The determination in the step S1 is performed by detecting the status of accelerating operation by the driver based on the accelerator opening degree signal (APS) 92. For example, in the case where the accelerator opening degree signal (APS) 92 is within a predetermined range (e.g., 1.5° from the position at which the accelerator throttle is completely closed, it is determined that the accelerator is OFF; in the case where the accelerator opening degree signal (APS) 92 is not within the predetermined range, it is determined that the accelerator is ON. In the case where it is determined in the step S1 that the accelerator is OFF (Y), the step S1 is followed by the step S2; in the case where it is determined that the accelerator is ON (N), the step S1 is followed by the step S24 (in FIG. 5B).

In the step S24, it is determined whether or not the target value N_TAG of the engine rotation speed has reached the third predetermined rotation speed N3, which is idle target rotation speed; in the case where the target value N_TAG of the engine rotation speed has not reached the third predetermined rotation speed N3 (N), the processing in and after the step S2 (in FIG. 5A) is performed; in the case where the target value N_TAG of the engine rotation speed has reached the third predetermined rotation speed N3 (Y), the step S24 is followed by the step S25, where the control phase initialized to "0" (PHS=0).

Next, in the step S25, in order to stop the drive by the motor generator 30, the driving torque output value is set to "0" (Tq_MG=0); then, in the step S27, the timer counter TMC is initialized (TMC=0) and the processing is ended, so that the vehicle moves to the traveling mode MD3 where the vehicle is driven by the engine.

In the case where it is determined in the step S1 of FIG. 5A that the accelerator is OFF (the accelerator pedal is released) (Y), the step S1 is followed by the step S2, where it is determined whether or not the control phase is "0" (PHS=0). In the case where the control phase is "0" (PHS=0) (Y), the step S2 is followed by the step S3, where it is determined whether or not the brake pedal has been released (BRK_SW=OFF); in the case where the brake pedal has been released (Y), the control phase is set to "1" (PHS=1) in the step S4; then, the step S4 is followed by the step S5.

In the step S5, it is determined whether or not the engine rotation speed Ne is larger than the first predetermined rotation speed N1 (Ne>N1); in the case where it is determined that the engine rotation speed Ne is larger than the first predetermined rotation speed N1 (Y), the step S5 is followed by the step S9, where the control phase is set to "2" (PHS=2); then, the processing in and after the step S23 is performed.

The detail of the processing in and after the step S23 will be described later. Describing schematically, in the foregoing processing, in the transition, while the vehicle travels, from the idling stop mode MD1 to the creeping travel mode MD2 where the engine is driven by the motor generator, the idle target rotation speed N3 is set to the target value N_TAG of the engine rotation speed; the driving torque Tq_NFB of the motor generator 30, calculated through the rotation speed F/B control calculation based on the difference between the set target value N_TAG and the engine rotation speed Ne, is outputted as the driving torque Tq_MG of the motor generator. As a result, driving-torque shock is suppressed, whereby transition to the creeping travel mode where the engine is driven by the motor generator can smoothly be realized.

In the case where in the step S5, it is determined that the engine rotation speed Ne is the same as or lower than the first predetermined rotation speed N1 (Ne N1) (N), the step S5 is followed by the step S6, where an initial value Tq_INI of the driving torque of the motor generator 30 is calculated through the equation (1) below.

$$Tq\_INI = Tq\_BS + Tq\_TM + Tq\_TH + Tq\_LN \quad (1)$$

Next, the equation (1) will be explained.

Figure 6:
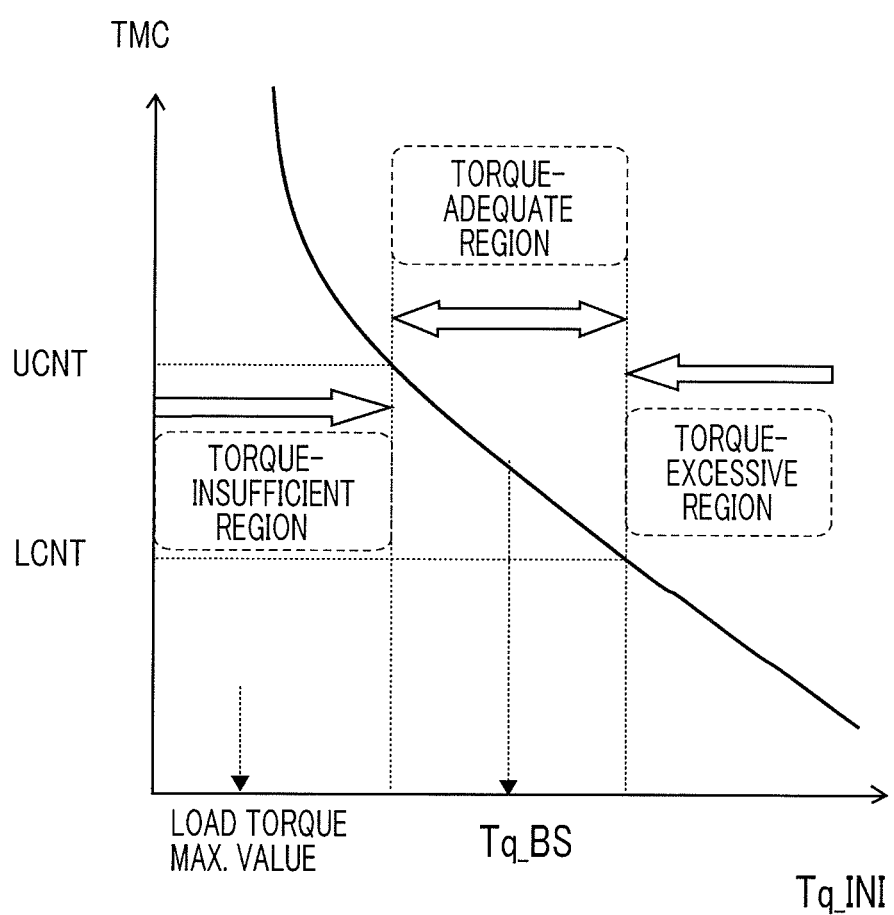
FIG. 6 is an explanatory graph for explaining the operation of a vehicle drive control system according to Embodiment 1 of the present invention.

Tq_BS in the equation (1) denotes reference torque for the initial value Tq_INI of the driving torque and is set as represented in FIG. 6. In other words, FIG. 6 is an explanatory graph for explaining the operation of a vehicle drive control system according to Embodiment 1 of the present invention; the explanatory graph is a drive response characteristic graph that represents the relationship between the initial value Tq_INI of the driving torque of the motor generator 30 and the timer counter value TMC at a time when in the case of transition from the idling stop mode to the creeping travel mode where the engine is driven by the motor generator, under the condition that the water temperature (WT_B) and the throttle opening degree (TH_B) are kept constant, the driving torque of the motor generator 30 is outputted as the initial value Tq_INI thereof is varied. In FIG. 6, the abscissa denotes the initial value Tq_INI of the driving torque, and the ordinate denotes the timer counter value TMC.

As represented in FIG. 6, the reference torque Tq_BS for the initial value of the driving torque is preliminarily set in a torque-adequate region in such a way as to be larger than the maximum value of the load torque determined by a cylinder compression resistance at a time when engine cranking is performed, engine friction torque, air-intake resistance, and the like, and in such a way that the timer counter value TMC falls between the allowable lower limit value LCNT and the allowable upper limit value UCNT.

In the case where the reference torque Tq_BS for the initial value of the driving torque is set within a torque-insufficient region, the timer counter value TMC is measured as a value that is the same as or larger than the allowable upper limit value UCNT, which may lead to delay in a vehicle start response. In contrast, in the case where the reference torque Tq_BS for the initial value of the driving torque is set within a torque-excessive region, the timer counter value TMC is measured as a value that is the same or smaller than the allowable lower limit value LCNT, which may lead to a starting torque shock. Therefore, the reference torque Tq_BS for the initial value of the driving torque is set within the torque-adequate region.

Figure 7:
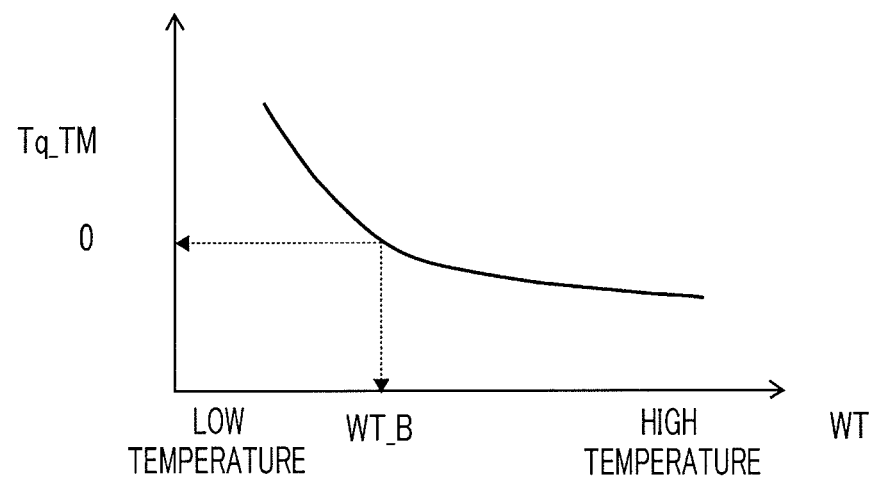
FIG. 7 is an explanatory graph for explaining the operation of a vehicle drive control system according to Embodiment 1 of the present invention.

Tq_TM in the equation (1) denotes the friction-torque changing amount against the friction torque, of the engine drive system, that is measured at a time when the water temperature is a reference water temperature WT_B, and is set as represented in FIG. 7. In other words, FIG. 7 is an explanatory graph for explaining the operation of a vehicle drive control system according to Embodiment 1 of the present invention; the explanatory graph represents map data in which in accordance with the water temperature WT, there is set the friction-torque changing amount against the friction torque, of the engine drive system, that is measured at a time when the water temperature is the reference water temperature WT_B, i.e., when the drive response characteristic in FIG. 6 is measured. In FIG. 7, the abscissa denotes the water temperature WT, and the ordinate denotes the friction-torque changing amount Tq_TM.

As represented in FIG. 7, the friction-torque changing amount Tq_TM against the friction torque of the engine drive system is "0" when the water temperature WT is the reference water temperature WT_B; when the reference water temperature WT_B is set to be lower than the water temperature indicated in FIG. 7, the friction-torque changing amount Tq_TM increases from when the reference water temperature WT_B is set to be higher than the water temperature indicated in FIG. 7, the friction-torque changing amount Tq_TM decreases from "0". The friction-torque changing amount Tq_TM against the friction torque of the engine drive system is read from the map data represented in FIG. 7.

Figure 8:
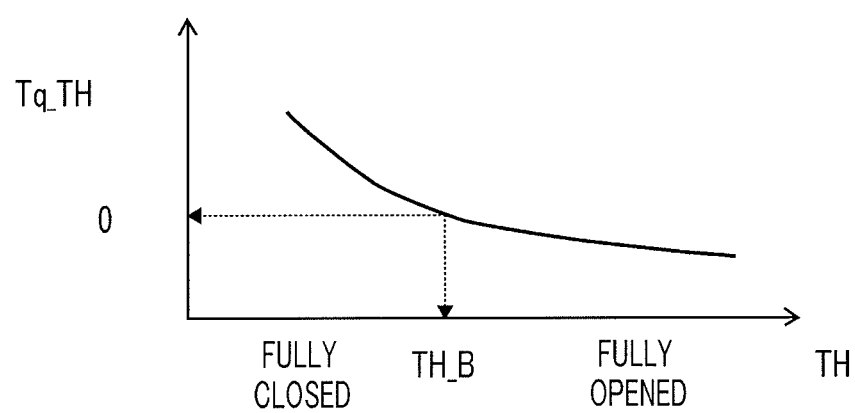
FIG. 8 is an explanatory graph for explaining the operation of a vehicle drive control system according to Embodiment 1 of the present invention.

Tq_TH in the equation (1) denotes the rotation-load-torque changing amount in the rotation load torque, corresponding to the air-intake resistance, that is measured at a time when the throttle opening degree is a reference throttle opening degree TH_B, and is set as represented in FIG. 8. In other words, FIG. 8 is an explanatory graph for explaining the operation of a vehicle drive control system according to Embodiment 1 of the present invention; the explanatory graph represents map data in which in accordance with the throttle opening degree TH, there is set the rotation-load-torque changing amount in the rotation load torque, corresponding to the air-intake resistance, that is measured at a time when the throttle opening degree is the reference throttle opening degree TH_B, i.e., when the drive response characteristic in FIG. 6 is measured. In FIG. 8, the abscissa denotes the throttle opening degree TH, and the ordinate denotes the rotation-load-torque changing amount Tq_TH.

As represented in FIG. 8, the rotation-load-torque changing amount Tq_TH in the rotation load torque corresponding to the air-intake resistance is "0" when the throttle opening degree is the reference throttle opening degree TH_B; when the reference throttle opening degree TH_B is set to be closer to the degree of the fully closed state than the degree indicated in FIG. 8, the rotation-load-torque changing amount Tq_TH increases from "0"; when the reference throttle opening degree TH_B is set to be closer to the degree of the fully opened state than the degree indicated in FIG. 8, the rotation-load-torque changing amount Tq_TH decreases from "0". The rotation-load-torque changing amount Tq_TH in the rotation load torque corresponding to the air-intake resistance is read from the map data represented in FIG. 8.

Figure 9:
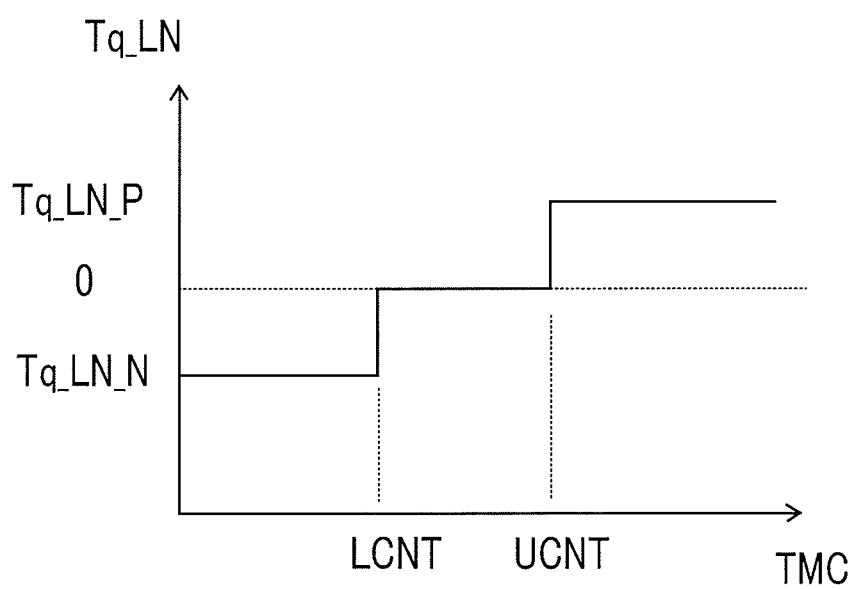
FIG. 9 is an explanatory graph for explaining the operation of a vehicle drive control system according to Embodiment 1 of the present invention.

Tq_LN in the equation (1) denotes driving-torque learning correction amount and is set as represented in FIG. 9. In other words, FIG. 9 is an explanatory graph for explaining the operation of a vehicle drive control system according to Embodiment 1 of the present invention; the abscissa denotes the timer counter value TMC, and the ordinate denotes the driving-torque learning correction amount Tq_LN.

The driving-torque learning correction amount Tq_LN is calculated as represented in FIG. 9. In other words, in FIG. 9, when the timer counter value TMC falls between the allowable upper limit value UCNT and the allowable lower limit value LCNT before the engine rotation speed reaches the first predetermined rotation speed N1, the driving-torque learning correction amount Tq_LN is "0"; when the timer counter value TMC is larger than the allowable upper limit value UCNT, the driving-torque learning correction amount Tq_LN is calculated through the equation "Tq_LN=Tq_LN+ Tq_LN_P"; when the timer counter value TMC is smaller than the allowable lower limit value LCNT, the driving-torque learning correction amount Tq_LN is calculated through the equation "Tq_LN=Tq_LN+Tq_LN_N".

Next, again in FIG. 5A, after in the step S6, the initial value Tq_INI of the driving torque of the motor generator 30 is calculated through the equation (1), the step S6 is followed by the step S7, where the initial value Tq_INI of the driving torque, calculated based on the equation (1), is outputted as the driving torque Tq_MG (=Tq_INI) of the motor generator 30; then, in the step S8, the timer counter is cleared (TMC=0), and the processing is ended.

Next, in the case where it is determined in the step S2 that the control phase PHS is not "0" (N), the step S2 is followed by the step S10, where it is determined whether or not the braking operation is cancelled (BRK_SW=OFF); in the case where it is determined that the brake pedal is being depressed (N), the control phase PHS is initialized (PHS=0) in the step S11, and the step S11 is followed by the step S12, where the drive by the motor generator 30 is stopped (the driving torque is set to zero, Tq_MG=0); next, the processing in the step S8 is performed; then, the processing is ended. Also in the case where it is determined in the step S3 that the brake pedal is being depressed (N), the processing in and after the step S11 is performed; then, the processing is ended.

Next, in the case where it is determined in the step S10 that the braking operation has been cancelled (BRK_SW=OFF) (Y), the step S10 is followed by the step S13, where it is determined whether or not the control phase PHS is "1" (PHS=1); in the case where it is determined that the control phase PHS is "1" (Y), the step S13 is followed by the step S14.

In the step S14, the timer counter value TMC is counted up by 1 (TMC=TMC+1); then, in the step S15, it is determined whether or not the engine rotation speed Ne has exceeded the first predetermined rotation speed N1. In the case where it is determined in the step S15 that the engine rotation speed Ne has not exceeded the first predetermined rotation speed N1 (N), the processing is immediately ended; in the case where it is determined that the engine rotation speed Ne has exceeded the first predetermined rotation speed N1 (Y), the step S15 is followed by the step S16, where the control phase PHS is set to "2" (PHS=2).

Next, in the step S17, when the timer counter value TMC is larger than the allowable upper limit value UCNT before the engine rotation speed reaches the first predetermined rotation speed N1, the driving-torque learning correction amount Tq_LN is calculated through the equation "Tq_LN=Tq_LN+ Tq_LN_P"; when the timer counter value TMC is the same as or lower than the allowable lower limit value LCNT before the engine rotation speed reaches the first predetermined rotation speed N1, the driving-torque learning correction amount Tq_LN is calculated through the equation "Tq_LN=Tq_LN+ Tq_LN_N" so that learning is performed.

Next, in the step S18, the target value N_TAG of the engine rotation speed is set to the second predetermined rotation speed N2 (N_TAG=N2); in the step S19, based on the difference (=N_TAG−Ne) between the target value N_TAG (=N2) of the engine rotation speed and the real engine rotation speed Ne, the driving torque Trq_NFB of the motor generator 30 is calculated by performing a rotation speed F/B control calculation utilizing an ordinary PID control equation; after that, in the step S20, the driving torque Tq_MG of the motor generator 30 is set to the driving torque Tq_NFB (Tq_MG=Tq_NFB) at a time when the rotation speed F/B control calculation is performed; then, the processing is ended.

In contrast, in the case where it is determined in the step S13 that the control phase PHS is not "1" (PHS=2) (N), the step S13 is followed by the step S21, where the target value N_TAG of the engine rotation speed is calculated through a target rotation speed calculation (N_TAG=N_TAG+DN1) in such a way that the idle target rotation speed N3 of the engine is reached at the predetermined changing speed DN; in the step S22, it is determined whether or not the target value N_TAG of the engine rotation speed has become the same as or higher than the idle target rotation speed N3.

In the case where it is determined in the step S22 that the target value N_TAG of the engine rotation speed is lower than the idle target rotation speed N3 (N), the step S22 is directly followed by the step S19; in the case where it is determined that the target value N_TAG of the engine rotation speed is the same or higher than the idle target rotation speed N3 (Y), the step S22 is followed by the step S23, where the target value N_TAG of the engine rotation speed is set to the idle target rotation speed N3. Next, in the step S19, based on the difference between the set target rotation speed N_TAG and the engine rotation speed Ne, the driving torque Trq_NFB of the motor generator 30 is calculated through the rotation speed F/B control calculation; after that, in the step S20, the calculated driving torque Trq_NFB is outputted as the driving torque Tq_MG of the motor generator so that the vehicle travels in a creeping manner.

FIG. 10 is a timing chart for explaining the operation of a vehicle drive control system according to Embodiment 1 of the present invention; the timing chart represents control operation at a time of transition from the idling stop mode MD1 to the creeping travel mode MD2 where the engine is driven by the motor generator. In FIG. 10, (a), (b), (c), (d), (e), and (f) represent the brake switch signal BRK_SW, the driving torque Tq_MG of the motor generator, the vehicle speed Vsp, the engine rotation speed Ne, the timer counter value TMC, and the control phase PHS, respectively.

In FIG. 10, in the period until the time instant t0, the driver depresses the brake pedal, the engine is stopped, and the vehicle is at a standstill; the vehicle is in the so-called idling stop mode MD1. In this situation, the driving by the in this situation is interrupted; the brake switch signal BRK_SW represented in (a) is ON, the driving torque Tq_MG represented in (b) is "0", the vehicle speed Vsp represented in (c) is "0", the engine rotation speed Ne represented in (d) is "0", the timer counter value TMC represented in (e) is "0", and the control phase PHS represented in (f) is "0".

Next, when at the time instant t0, the driver lifts his foot off the brake pedal so as to cancel the braking operation, the brake switch signal BRK_SW represented in (a) becomes OFF and the control phase PHS represented in (f) becomes "1". Then, initial value Tq_INI of the driving torque of the motor generator is calculated through the equation (1), and the driving torque Tq_MG of the motor generator represented in (b) becomes the calculated initial value Tq_INI. At the same time, the timer counter starts counting (TMC=TMC+1) and hence the timer counter value TMC represented in (e) increases.

After the time instant t0, the rotation-driving force of the motor generator 30, i.e., the driving torque Tq_MG of the motor generator represented in (b) is transmitted from the pulley 27 of the motor generator 30 to the crank pulley 26 by the intermediary of the belt 28; then, the crankshaft of the engine in the fuel cutoff state is rotated, so that the engine rotation speed Ne starts to increase. As a result, the driving torque Tq_MG of the motor generator 30 at a time of engine cranking is outputted as an adequate value corresponding to the driving condition.

At the time instant t1 when the engine rotation speed Ne represented in (d) reaches the first predetermined rotation speed N1 after it increases, the control phase PHS is set to "2"; based on the difference (=N_TAG−Ne) between the preliminarily set target value N_TAG (=N2) of the engine rotation speed and the real engine rotation speed Ne, the driving torque Tq_NFB of the motor generator 30 is calculated by performing a rotation speed F/B control calculation utilizing an ordinary PID control equation; then, the driving torque Tq_NFB at a time when the rotation speed F/B control calculation is performed is outputted as the driving torque Tq_MG (=Tq_NFB) of the motor generator 30.

In this situation, when the timer counter value TMC is larger than the allowable upper limit value UCNT before the engine rotation speed Ne reaches the first predetermined rotation speed N1, the driving-torque learning correction amount Tq_LN is calculated through the equation "Tq_LN=Tq_LN+Tq_LN_P"; when the timer counter value TMC is the same as or smaller than the allowable lower limit value LCNT, the driving-torque learning correction amount Tq_LN is calculated through the equation "Tq_LN=Tq_LN+Tq_LN_N" so that learning is performed. As a result, the driving torque of the motor generator 30 is learning-corrected to a value corresponding to the individual variability in the driving torque characteristic of the motor generator 30 and the load torque characteristic at a time of engine cranking, so that driving-torque shock is suppressed when the vehicle starts moving.

After that, the target value N_TAG of the engine rotation speed is calculated (N_TAG=N_TAG+DN1) every predetermined processing cycle (e.g., 10[ms]) so that the engine rotation speed Ne represented in (d) reaches the idle target rotation speed N3 of the engine from the second predetermined rotation speed N2 at a predetermined changing speed DN; then, based on the difference between the target value N_TAG of the engine rotation speed and the real engine rotation speed Ne, the driving torque Tq_MG of the motor generator 30 is outputted through the rotation speed F/B control calculation.

The driving force of the motor generator 30 makes the vehicle start a creeping travel, and the vehicle speed represented in (c) gradually increases. After at the time instant t2, the target rotation speed N_TAG of the engine reaches the idle target rotation speed N3 of the engine, the target rotation speed N_TAG is set to the idle target rotation speed N3; based on the difference between the target value N_TAG (=N3) of the engine rotation speed and the real engine rotation speed Ne, the driving torque Tq_MG of the motor generator is outputted by performing a rotation speed F/B control calculation. As a result, it is made possible that while the responsiveness in the creeping start is ensured, the starting torque shock is suppressed.

In addition, in the vehicle drive control system according to Embodiment 1 of the present invention, it may be allowed that in the case where the rotation speed of the engine is higher than the first predetermined rotation speed, the target rotation speed of the engine is immediately set to the idle target rotation speed of the engine, the driving torque of the motor generator is calculated through the rotation speed feedback control calculation based on the difference between the target rotation speed and the engine rotation speed, and the motor generator is controlled to output the calculated driving torque.

Embodiment 2

Figure 11A:
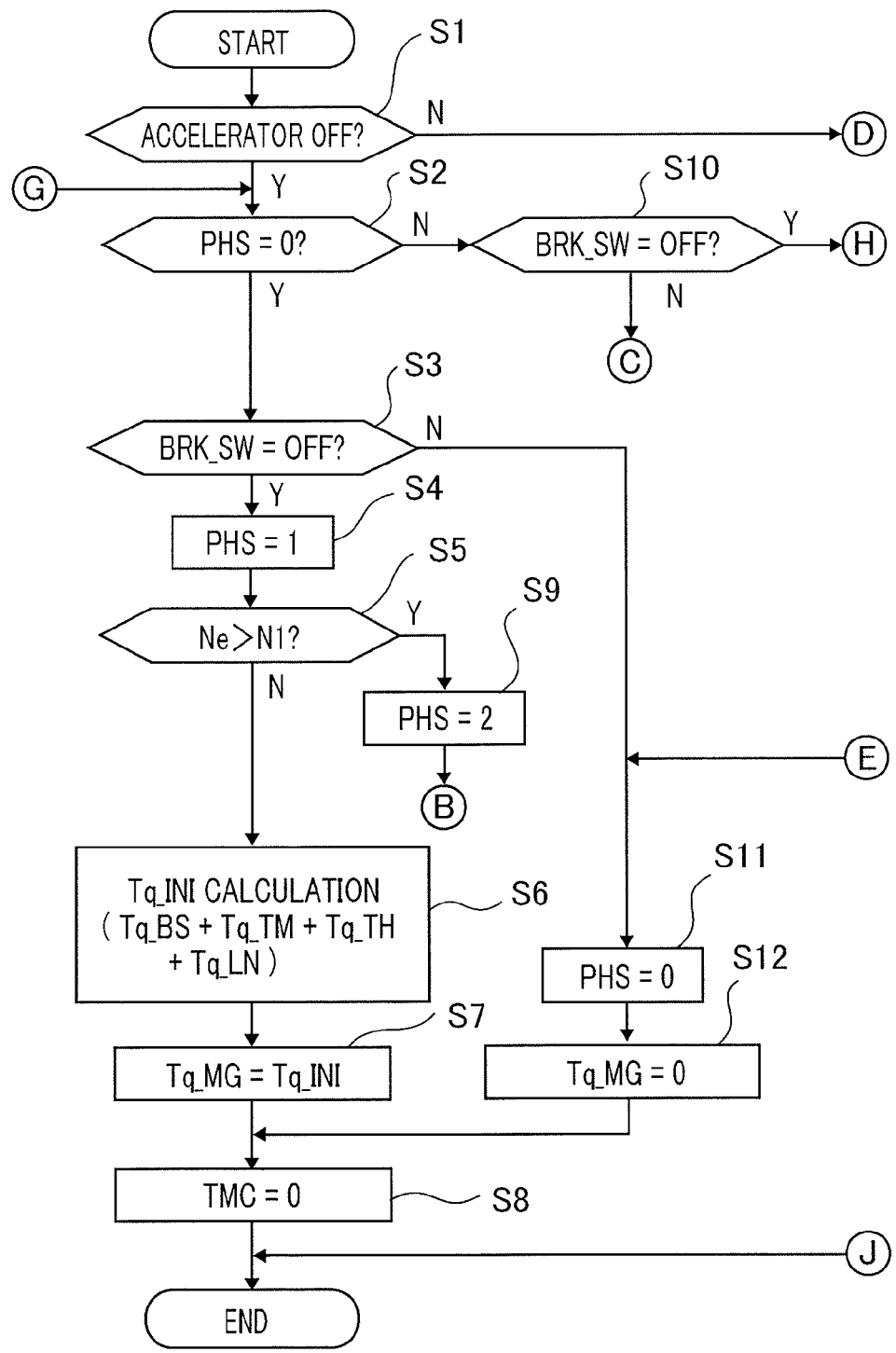
FIG. 11A is a flowchart representing the operation of a vehicle drive control system according to Embodiment 2 or 3 of the present invention.
Figure 11B:
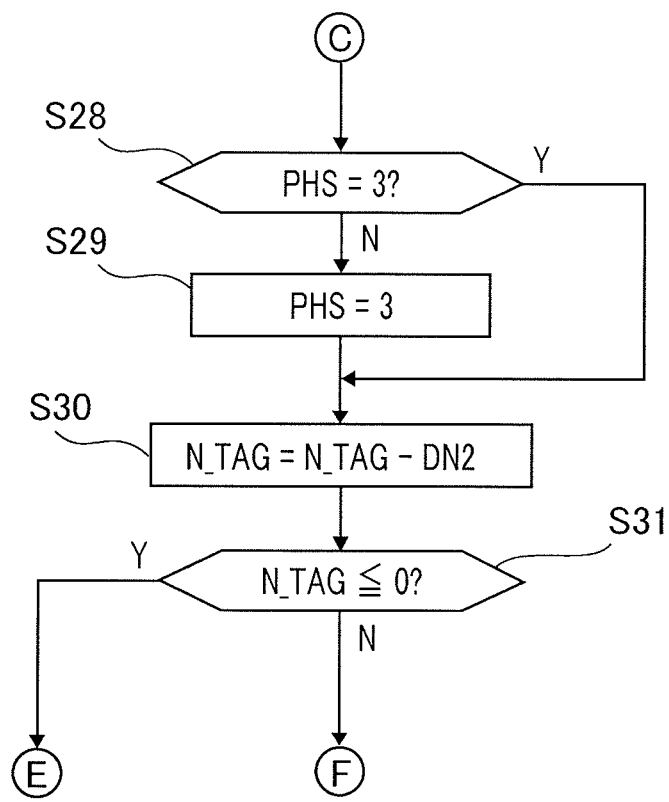
FIG. 11B is a flowchart representing the operation of a vehicle drive control system according to Embodiment 2 of the present invention.

Next, there will be explained a vehicle drive control system according to Embodiment 2 of the present invention. FIG. 11A is a flowchart representing the operation of a vehicle drive control system according to Embodiment 2 or 3 of the present invention; FIG. 11B is a flowchart representing the operation of a vehicle drive control system according to Embodiment 2 of the present invention. In the following description, the explanation for processing steps the same as those in Embodiment 1 will be omitted.

In FIG. 11A, in the case where when the control phase PHS is "1" (PHS=1) or "2" (PHS=2) and the vehicle is in the creeping travel mode MD2 where the engine is driven by the motor generator, it is determined in the step S10 that the brake depression operation by the driver is ON (N), the step S10 is followed by the step S28 in FIG. 11B. In the step S28, it is determined whether or not the control phase PHS is "3" (PHS=3); in the case where the control phase PHS is "3" (Y), the step S28 is followed by the step S30; in the case where the control phase PHS is not "3" (N), the control phase PHS is set to "3" (PHS=3), and then the step S28 is followed by the step S30.

In the step S30, the target value N_TAG of the engine rotation speed is calculated through the equation "N_TAG=N_TAG−DN2" so that the engine rotation speed is decreases at the second predetermined changing speed DN2 (e.g., 8 rpm/10 ms) from the idle target rotation speed (N_TAG=N3). This calculation is performed every predetermined cycle (e.g., 10 [ms]).

Figure 11C:
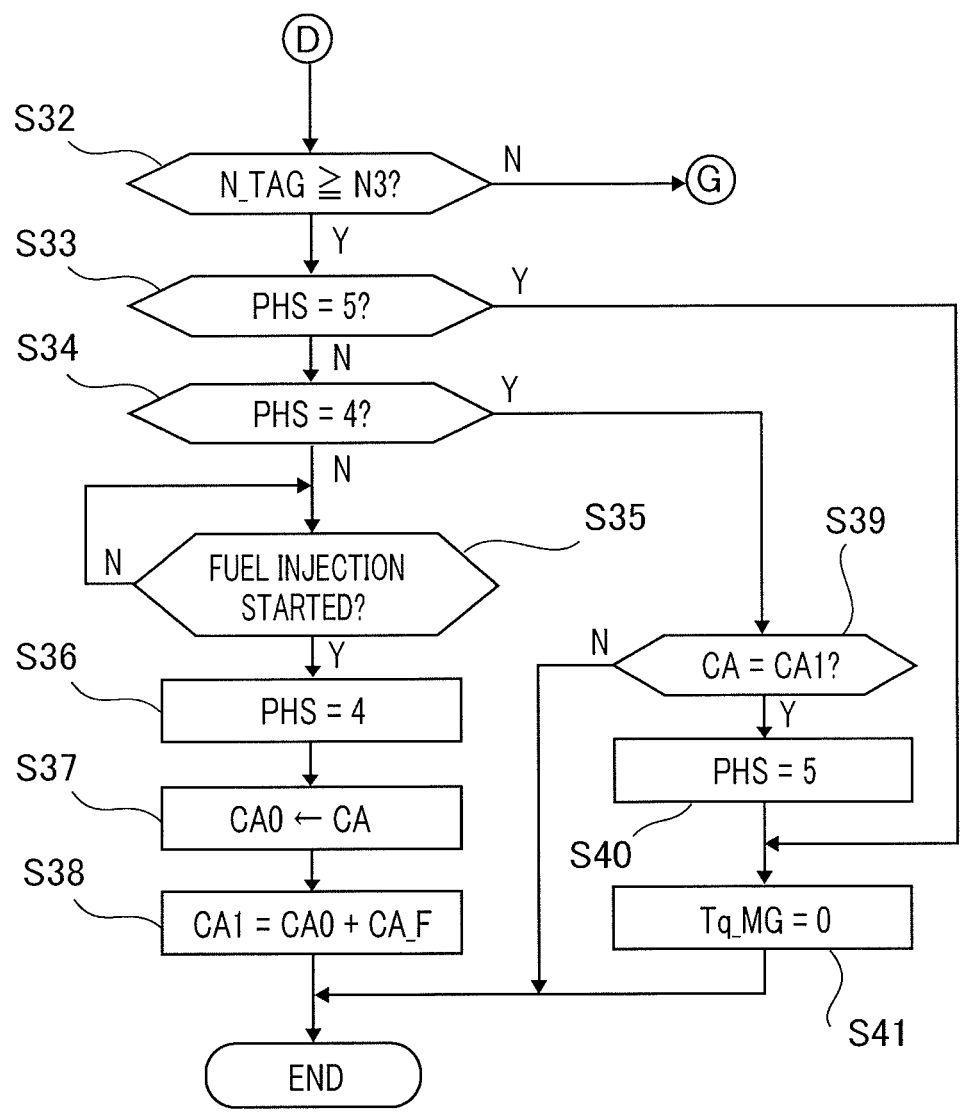
FIG. 11C is a flowchart representing the operation of a vehicle drive control system according to Embodiment 3 of the present invention.
Figure 11D:
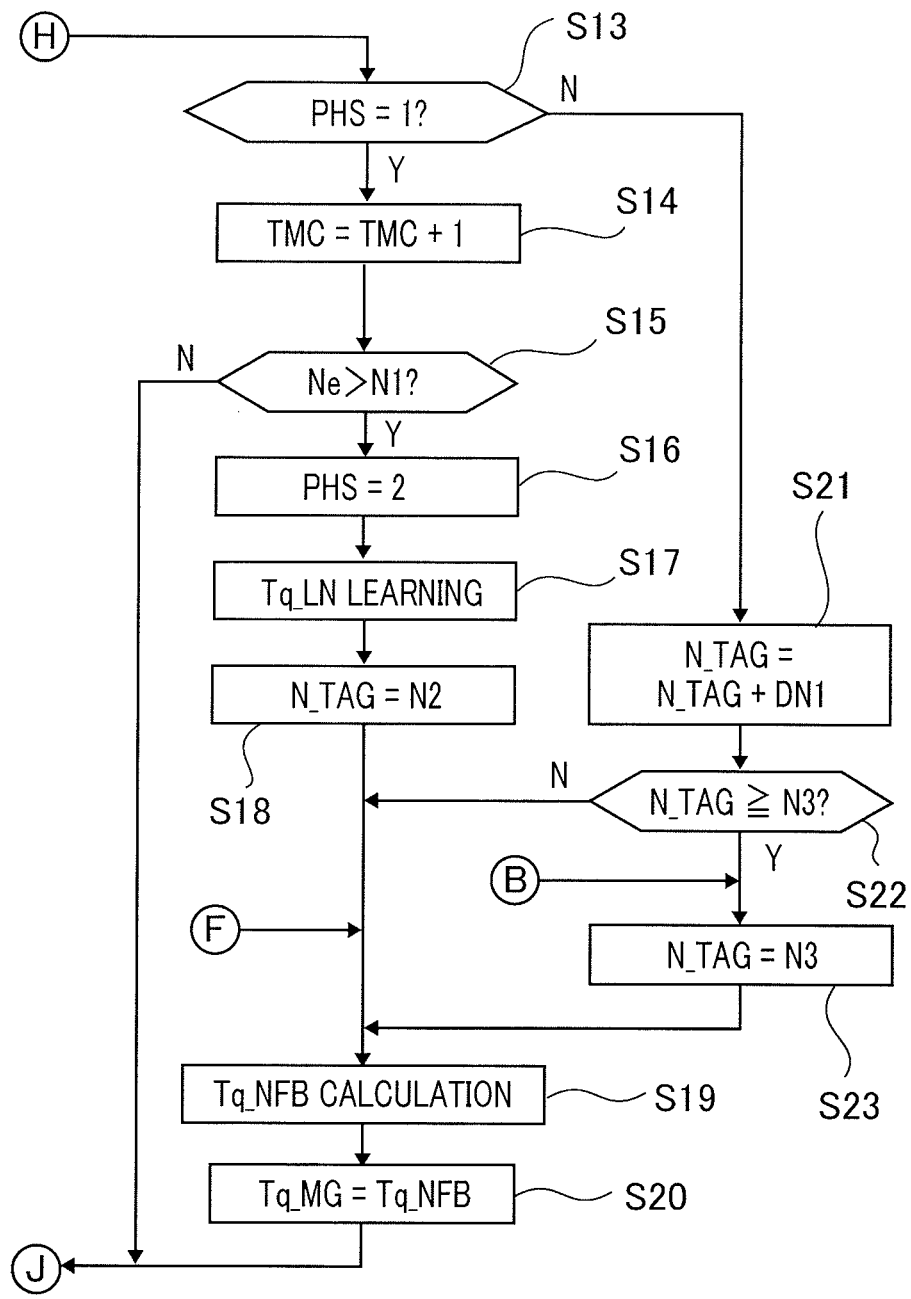
FIG. 11D is a flowchart representing the operation of a vehicle drive control system according to Embodiment 3 of the present invention.

Next, in the step S31, it is determined whether or not the target value N_TAG of the engine rotation speed has reached "0" [rpm]; in the case where the target value N_TAG of the engine rotation speed has not reached "0" [rpm] (N), the step S31 is followed by the step S19 in FIG. 11D, where the driving torque Tq_NFB of the motor generator 30 is calculated through the rotation speed F/B control calculation; then, in the step S20, the driving torque output value Tq_MG of the motor generator 30 is set to the calculated driving torque Tq_NFB.

In the case where in the step S31 in FIG. 11B, it is determined that the target value N_TAG of the engine rotation speed has reached "0" [rpm] (Y), the step S31 is followed by the step S11 in FIG. 11A, where the control phase PHS is initialized to "0" (PHS=0); then, in the step S12, in order to stop the driving by the motor generator 30, the driving torque Tq_MG is set to "0" (Tq_MG=0); after that, the timer counter value TMC is initialized (TMC=0), and the processing is ended.

In the foregoing vehicle drive control system according to Embodiment 2 of the present invention, when the brake depression operation is performed (BRK_SW=ON) during the creeping travel through the driving by the motor generator, the motor generator 30 is driving-controlled through the rotation speed F/B control so that the target value N_TAG of the engine rotation speed decreases at the predetermined changing speed DN2 from the idle target rotation speed N3 to "0" [rpm]; therefore, there can be demonstrated an effect that unintended feeling of deceleration is not given to the driver and that the brake depression operation is prevented from making the motor generator wastefully dissipate electric power while the vehicle speed is low (e.g., 10 [Km/h]).

Figure 12:
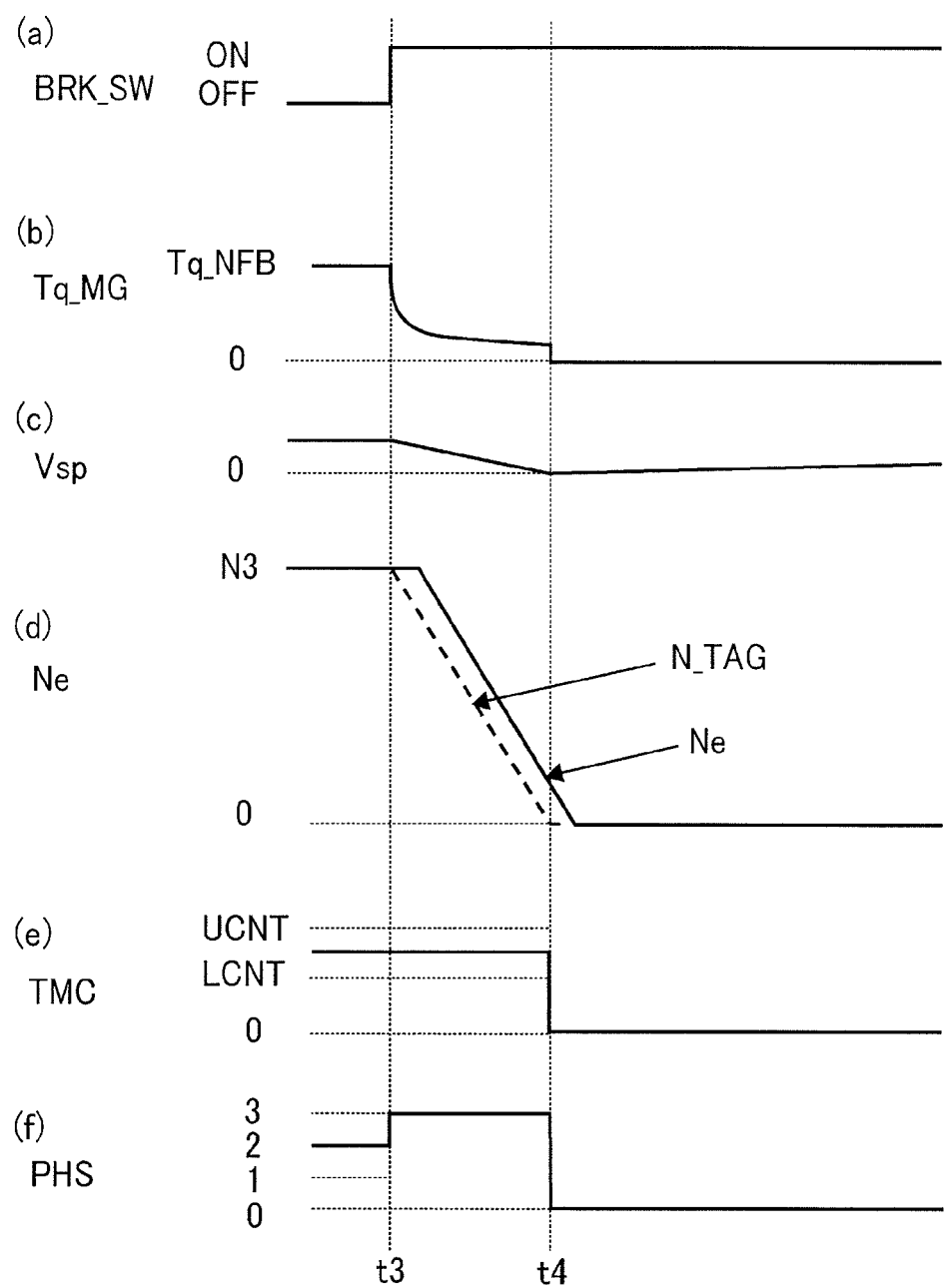
FIG. 12 is a timing chart for explaining the operation of a vehicle drive control system according to Embodiment 2 of the present invention.

FIG. 12 is a timing chart for explaining the operation of a vehicle drive control system according to Embodiment 2 of the present invention. In FIG. 12, (a), (b), (c), (d), (e), and (f) represent the brake switch signal BRK_SW, the driving torque Tq_MG of the motor generator, the vehicle speed Vsp, the engine rotation speed Ne, the timer counter value TMC, and the control phase PHS, respectively.

In FIG. 12, when at the time instant t3, the driver performs brake depression operation (BRK_SW=ON) while the vehicle travels in a creeping manner under the condition that the vehicle is in the creeping travel MD2 where the engine is driven by the motor generator and the control phase PHS is "2" (PHS=2), the target value N_TAG of the engine rotation speed is decreased at the second predetermined changing speed DN2 from the third predetermined rotation speed N3, which is an idle target rotation speed; based on the rotation-speed deviation (=N_TAG−Ne) between the target rotation speed N_TAG and the real engine rotation speed Ne, the driving torque Tq_MG is calculated as Tq_NFB through the rotation speed F/B control calculation; then, the driving torque Tq_MG of the motor generator is controlled.

As a result, as represented in (c), the vehicle speed Vsp does not rapidly decrease when the vehicle is decelerated through braking, whereby feeling of deceleration without feeling of discomfort can be given to the driver. Moreover, at the time instant t4 when the target rotation speed N_TAG reaches "0" [rpm], the control phase PHS represented in (f) is set to "0" (PHS=0), the timer counter value TMC represented in (e) is initialized (TMC=0), and the driving torque Tq_MG of the motor generator represented in (b) is set to "0" (Tq_MG=0) so that the driving by the motor generator is stopped; therefore, the motor generator can be prevented from wastefully dissipating electric power while braking operation is performed.

Embodiment 3

Next, there will be explained a vehicle drive control system according to Embodiment 3 of the present invention. FIG. 11C is a flowchart representing the operation of a vehicle drive control system according to Embodiment 3 of the present invention. In FIG. 11A, the explanation for processing steps the same as those in Embodiment 1 or Embodiment 2 will be omitted.

In FIGS. 11A and 11C, in the case where when the control phase PHS is "1" (PHS=1) or "2" (PHS=2) and the vehicle is in the creeping travel mode MD2 where the engine is driven by the motor generator, the brake depression operation by the driver is detected in the step S1 in FIG. 11A (N), the step S1 is followed by the step S32 in FIG. 11C; In the step S32, it is determined whether or not the target value N_TAG of the engine rotation speed has reached the third predetermined rotation speed N3; in the case where the target value N_TAG of the engine rotation speed has not reached the third predetermined rotation speed N3 (N), the step S32 is followed by the step S2 in FIG. 11A, and then the motor generator 30 performs engine cranking operation.

In the case where it is determined in the step S32 that the target value N_TAG of the engine rotation speed has reached the third predetermined rotation speed N3 (Y), the step S32 is followed by the step S33, where it is determined whether or not the control phase PHS is "5" (PHS=5?). In the case where the control phase PHS is "5" (Y), for the purpose of stopping the driving by the motor generator 30, the driving torque Tq_MG of the motor generator 30 is set to "0" (Tq_MG=0) in the step S41; then, after driving of the vehicle by the motor is replaced by driving of the vehicle by the engine, the processing is ended.

In the case where it is determined in the step S33 that the control phase PHS is not "5" (N), the step S33 is followed by the step S34, where it is determined whether or not the control phase PHS is "4" (PHS=4?); in the case where the control phase PHS is not "4" (N), the step S34 is followed by the step S35. In the step S35, it is determined whether or not fuel injection into a cylinder waiting for the intake stroke has been started; in the case where the fuel injection has not been started (N), the determination in the step S35 is repeated until the fuel injection is started, and when it is determined that the fuel injection has been started (Y), the step S35 is followed by the step S36.

In the step S36, the control phase PHS is set to "4" (PHS=4); then, in the step S37, the crank angle CA at a time when the fuel injection has been started is stored as a reference crank angle CA0. Next, in the step S38, by adding a preliminarily set predetermined crank angle CA_F (e.g., 600 [deg]) to the reference crank angle CA0 at a time when the fuel injection has been started, there is calculated a crank angle CA1 (CA1=CA0+CA_F) at which due to combustion in a combustion stroke, the engine torque rises from the reference crank angle CA0; then, the processing is ended.

In contrast, in the case where it is determined in the step S34 that the control phase PHS is "4" (PHS=4) (Y), the step S34 is followed by the step S39, where it is determined whether or not the present crank angle CA has reached the crank angle CA1 at which due to combustion in a combustion stroke, the engine torque rises from the reference crank angle CA0. In the case where the present crank angle CA has not reached the crank angle CA1 (N), the processing is immediately ended; in the case where the present crank angle CA has reached the crank angle CA1 (Y), the step S39 is followed by the step S40, where the control phase PHS is set to "5" (PHS=5). Next, in the step S41, in order to stop the driving by the motor generator 30, the driving torque Tq_MG is set to "0" (Tq_MG=0); then, the processing is ended.

Figure 13:
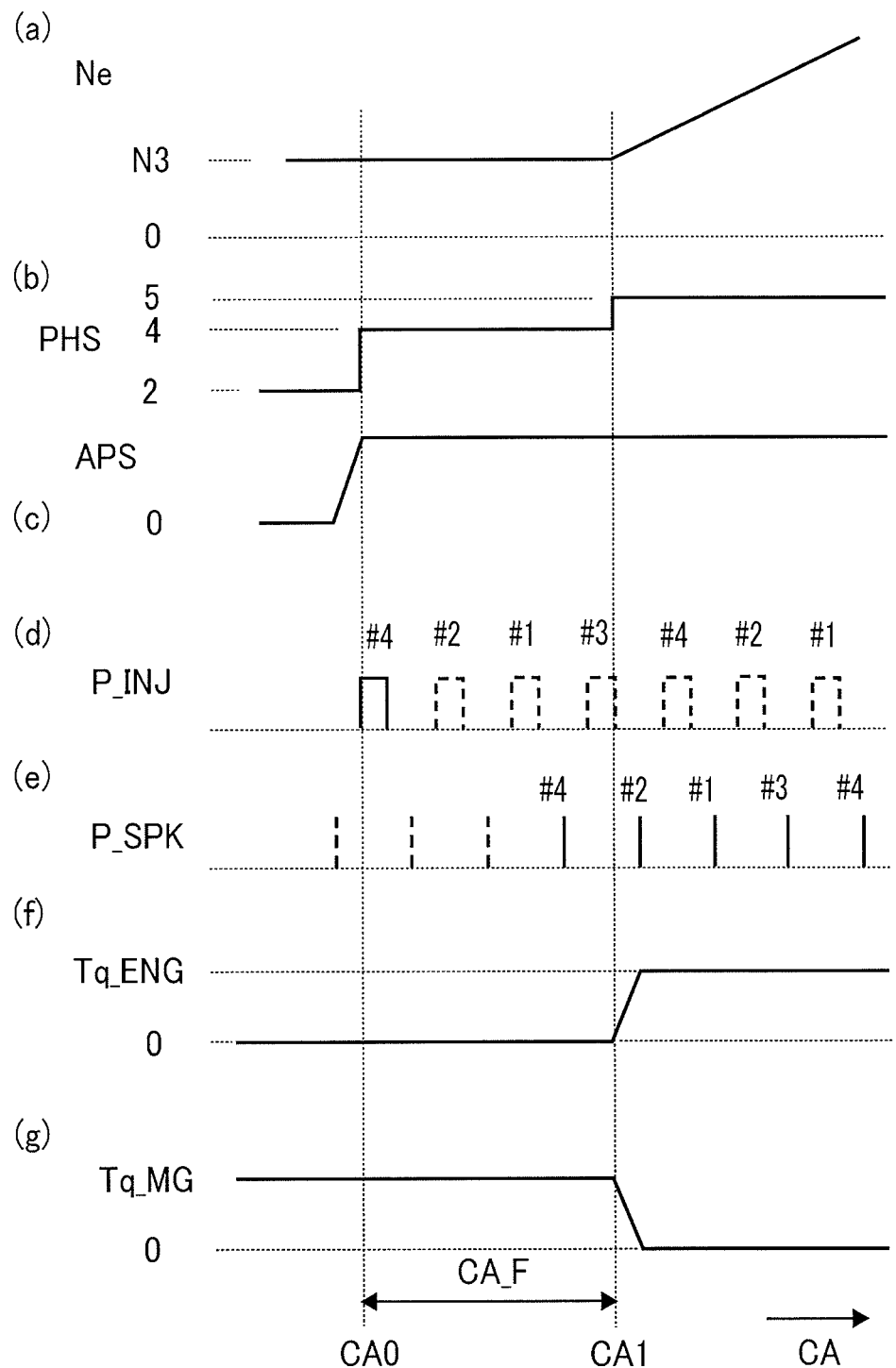
FIG. 13 is a timing chart for explaining the operation of a vehicle drive control system according to Embodiment 3 of the present invention.

FIG. 13 is a timing chart for explaining the operation of a vehicle drive control system according to Embodiment 3 of the present invention; (a), (b), (c), (d), (e), (f), and (g) represent the engine rotation speed Ne, the control phase PHS, the accelerator opening degree signal APS, the fuel injection pulse P_INJ, the ignition pulse P_SPK, the engine torque Tq_ENG produced through combustion, and the driving torque Tq_MG of the motor generator, respectively.

In FIG. 13, when at the time instant when the engine crank angle CA is CA0, the accelerator depression operation by the driver is detected due to a change in the APS signal represented in (c) while the vehicle travels in a creeping manner under the condition that the vehicle is in the creeping travel MD2 where the engine is driven by the motor generator and the control phase PHS is "2" (PHS=2), the fuel injection pulse P_INJ represented in (d) is outputted to a cylinder (#4 cylinder) waiting for the intake stroke and the crank angle CA at a time of this fuel injection is stored as the reference crank angle position CA0, and then there is stored the crank angle position CA1 obtained by adding a predetermined crank angle CA_F to the reference crank angle position CA0.

During the combustion stroke of the #4 cylinder, the ignition pulse P_PSK represented in (e) is outputted; when the crank angle CA reaches the crank angle position CA1 at which the engine torque Tq_ENG, represented in (f), produced through combustion rises, the control phase PHS represented in (b) is set to "5" (PHS=5) and the driving torque Tq_MG of the motor generator represented in (g) is set to "0" (Tq_MG=0) so that the driving by the motor generator 30 is stopped. After that, the engine rotation speed Ne represented in (a) increases as the engine torque Tq_ENG produced through combustion, represented in (f), increases; then, the vehicle starts moving and is accelerated. As a result, the engine-start torque shock can be suppressed, and the starting/acceleration performance can be ensured.

In the vehicle drive control system according to Embodiment 3 of the present invention, in the case where a vehicle moves to the creeping travel mode where the engine is driven by the motor generator or in the case where in order to accelerate the vehicle, the driver performs accelerator depression operation while the vehicle travels in a creeping manner, engine cranking is performed by the motor generator and when the engine rotation speed reaches the idle target rotation speed, fuel injection into a cylinder waiting for the intake stroke is started; at the same time, the crank angle at a time when fuel injection is started is utilized as the reference crank angle position CA0 and when the crankshaft rotates from the reference crank angle position CA0 to the position of the predetermined crank angle CA_F and hence the crank angle position CA1 is reached, the driving by the motor generator is stopped. As a result, driving force for the vehicle produced by the motor is smoothly change to driving force produced by the engine, so that there is demonstrated an effect that while the torque shock at a time when the driving force is changed is suppressed, the starting/acceleration performance can be ensured.

As a vehicle drive control system according to the present invention, which has been explained heretofore based on each of Embodiments 1 through 3, the present invention has the following features:

(1) A vehicle drive control system according to the present invention is configured in such a way that under the condition that there is provided a motor coupled with the driving shaft of an internal combustion engine mounted in a vehicle and hence the torque of the engine can be transmitted to the drive wheels of the vehicle when fuel supply to the engine is cut off, the vehicle is made to travel in a creeping manner while motoring of the engine is performed through the driving force of the motor generator; the vehicle drive control system is characterized in that in the case where when braking operation is cancelled while accelerating operation is stopped, the vehicle is made to travel in a creeping manner while motoring of the engine is performed through the driving force of the motor, when the rotation speed of the engine is the same as or lower than a first predetermined rotation speed, the motor is controlled in such a way that a preliminarily set initial value of the driving torque is outputted until the engine rotation speed reaches the first predetermined rotation speed.

In the vehicle drive control system, configured as described above, according to the present invention, in the case where when braking operation is cancelled while accelerating operation is stopped, the vehicle is made to travel in a creeping manner while motoring of the engine is performed through the driving force of the motor, when the rotation speed of the engine is the same as or lower than a first predetermined rotation speed, the motor is controlled in such a way that a preliminarily set initial value of the driving torque is outputted until the engine rotation speed reaches the first predetermined rotation speed; therefore, the torque shock can be suppressed when the vehicle starts moving.

(2) A vehicle drive control system according to the present invention is characterized in that a target rotation speed of the engine is set in such a way that after the rotation speed of the engine reaches the first predetermined rotation speed, the rotation speed of the engine reaches from a preliminarily set second predetermined rotation speed, as the initial value of a target rotation speed of the engine, to an idle target rotation speed of the engine at a first predetermined changing speed; through a rotation speed feedback control calculation based on the difference between the set target rotation speed and the rotation speed of the engine, driving torque of the motor is calculated; and the motor is controlled to output the calculated driving torque.

The vehicle drive control system, configured as described above, according to the present invention makes it possible to indirectly control the driving torque when the vehicle starts moving; thus, there is demonstrated an effect that while the torque shock at a time of starting is suppressed, rapid start responsiveness can be ensured.

(3) Moreover, a vehicle drive control system according to the present invention is characterized in that when the rotation speed of the engine reaches an idle target rotation speed of the engine, the target rotation speed of the engine is set to the idle target rotation speed of the engine; through a rotation speed feedback control calculation based on the difference between the target rotation speed and the rotation speed of the engine, driving torque of the motor is calculated; and the motor is controlled to output the calculated driving torque.

In the vehicle drive control system, configured as described above, according to the present invention, the motor is prevented from outputting excessive torque when the vehicle, which has been traveling, moves to the creeping travel mode where the engine is driven by the motor; therefore, there is demonstrated an effect that torque shock can be suppressed.

(4) A vehicle drive control system according to the present invention is characterized in that an initial value of the driving torque of the motor is set based on at least one of the temperatures of a coolant and a lubricant of the engine in such a way that the higher the temperature is, the smaller the initial value becomes.

The vehicle drive control system, configured as described above, according to the present invention can demonstrate an effect that there can be suppressed torque shock, at a time of starting, that is caused by temperature-induced fluctuation in the engine friction torque at a time of engine cranking.

(5) A vehicle drive control system according to the present invention is characterized in that an initial value of the driving torque of the motor is set in such a way as to become smaller in inverse proportion to the throttle opening degree.

The vehicle drive control system, configured as described above, according to the present invention can demonstrate an effect that there can be suppressed torque shock, at a time of starting, that is caused by throttle-opening-degree-induced fluctuation in the rotation load torque corresponding to air-intake resistance at a time of engine cranking.

(6) Furthermore, a vehicle drive control system according to the present invention is characterized in that an initial value of the driving torque of the motor is learning-corrected in accordance with the time from a time instant when the initial value of the driving torque is outputted to a time instant when the rotation speed of the engine reaches the first predetermined rotation speed.

The vehicle drive control system, configured as described above, according to the present invention can demonstrate an effect that there can be suppressed torque shock, at a time of starting, that is caused by the individual variability in engine load torque characteristic at a time of engine cranking and driving torque characteristic of the motor.

(7) Still moreover, a vehicle drive control system according to the present invention is characterized in that when the rotation speed of the engine is higher than the first predetermined rotation speed, a target rotation speed of the engine is set to an idle target rotation speed of the engine; through a rotation speed feedback control calculation based on the difference between the target rotation speed and the rotation speed of the engine, driving torque of the motor is calculated; and the motor is controlled to output the calculated driving torque.

In the vehicle drive control system, configured as described above, according to the present invention, the motor is prevented from outputting excessive torque when the vehicle, which has been traveling, moves to the creeping travel mode where the engine is driven by the motor; therefore, there is demonstrated an effect that torque shock can be suppressed.

(8) A vehicle drive control system according to the present invention is characterized in that in the case where when the vehicle is made to travel in a creeping manner while motoring of the engine is performed through the driving force of the motor, there is detected brake depression operation by the driver of the vehicle, the target rotation speed of the engine is reduced at a predetermined second changing speed until the engine stops; through a rotation speed feedback control calculation based on the rotation speed difference between the target rotation speed and a real rotation speed of the engine, the driving torque of the motor is calculated; and the motor is controlled to output the calculated driving torque.

The vehicle drive control system, configured as described above, according to the present invention demonstrates an effect that unintended feeling of deceleration is not given to the driver and that when the brake depression operation is performed, the motor can be prevented from wastefully dissipating electric power.

(9) Moreover, a vehicle drive control system according to the present invention is characterized in that in the case where when the vehicle is made to travel in a creeping manner while motoring of the engine is performed through the driving force of the motor, there is detected accelerator depression operation by the driver of the vehicle, fuel injection into a cylinder waiting for the intake stroke of the engine is started so that the engine is started; and the crank angle position at a time when the fuel injection is started is utilized as a reference crank angle position and when the crankshaft of the engine rotates from the reference crank angle position to a predetermined crank angle position, driving by the motor is stopped and then the vehicle travels by being driven by the engine.

The vehicle drive control system, configured as described above, according to the present invention makes driving force for the vehicle smoothly change from driving force produced by the motor to driving force produced by the engine; therefore, there is demonstrated an effect that torque shock can be suppressed when the driving force is changed and that the starting/acceleration performance can be ensured.

Various modifications and alterations of this invention will be apparent to those skilled in the art without departing from the scope and spirit of this invention, and it should be understood that this is not limited to the illustrative embodiments set forth herein.

What is claimed is:

1. A vehicle drive control system comprising:
a motor, coupled with a driving shaft of an internal combustion engine mounted in a vehicle;
wherein:
torque from the engine can be transmitted to one or more drive wheels of the vehicle when fuel supply to the engine is cut off;
the vehicle is made to travel in a creeping manner while motoring of the engine is performed through driving force of the motor;
when both a braking operation and an accelerating operation are not occurring, the vehicle is made to travel in the creeping manner while motoring of the engine is performed through driving force of the motor;
when a rotation speed of the engine is the same as or lower than a first predetermined rotation speed, the motor is controlled such that a preliminary set initial value of driving torque is outputted such that the rotation speed of the engine reaches the first predetermined rotation speed;
a target rotation speed of the engine is set to a preliminary set second predetermined rotation speed after the engine reaches the first predetermined rotation speed;
the rotation speed of engine changes from the preliminary set second predetermined rotation speed, at a first predetermined changing speed, to an idle target rotation speed of the engine after the engine reaches the first predetermined rotation speed;
driving torque of the motor is calculated through a rotation speed feedback control calculation based on a difference between the set target rotation speed and the rotation speed of the engine; and
the motor is controlled to output the calculated driving torque.

2. The vehicle drive control system according to claim 1, wherein:
when the rotation speed of the engine reaches the idle target rotation speed of the engine, the target rotation speed of the engine is set to the idle target rotation speed of the engine;
driving torque of the motor is calculated through a rotation speed feedback control calculation based on a difference between the target rotation speed and the rotation speed of the engine; and
the motor is controlled to output the calculated driving torque.

3. The vehicle drive control system according to claim 1, wherein an initial value of the driving torque of the motor is set based on at least one of a temperature of a coolant and a temperature of a lubricant of the engine in such a way that the higher the temperature is, the smaller the initial value becomes.

4. The vehicle drive control system according to claim 1, wherein an initial value of the driving torque of the motor is set in such a way as to become smaller in inverse proportion to a throttle opening degree.

5. The vehicle drive control system according to claim 1, wherein an initial value of the driving torque of the motor is learning-corrected in accordance with a time from a time instant when the initial value of the driving torque is outputted to a time instant when the rotation speed of the engine reaches the first predetermined rotation speed.

6. The vehicle drive control system according to claim 1, wherein:
when a rotation speed of the engine is higher than the first predetermined rotation speed, a target rotation speed of the engine is set to an idle target rotation speed of the engine;
driving torque of the motor is calculated through a rotation speed feedback control calculation based on a difference between the target rotation speed and the rotation speed of the engine; and
the motor is controlled to output the calculated driving torque.

7. The vehicle drive control system according to claim 1, wherein:
in the case where when the vehicle is made to travel in the creeping manner while motoring of the engine is performed through the driving force of the motor and there is subsequently detected a brake depression operation, a target rotation speed of the engine is reduced at a predetermined second changing speed until the engine stops;
driving torque of the motor is calculated through a rotation speed feedback control calculation based on a rotation speed difference between the target rotation speed and a real rotation speed of the engine;
the motor is controlled to output the calculated driving torque; and
driving by the motor is stopped.

8. The vehicle drive control system according to claim 1, wherein:

in the case where when the vehicle is made to travel in the creeping manner while motoring of the engine is performed through the driving force of the motor and there is subsequently detected an accelerator depression operation, fuel is injected into a cylinder waiting for the intake stroke of the engine such that the engine is started; and a crank angle position at a time when the fuel injection is started is utilized as a reference crank angle position, and when a crankshaft of the engine rotates from the reference crank angle position to a predetermined crank angle position, driving by the motor is stopped and then the vehicle travels by being driven by the engine.

* * * * *